(12) United States Patent
Yang

(10) Patent No.: US 9,703,979 B1
(45) Date of Patent: *Jul. 11, 2017

(54) METHODS AND COMPUTER PROGRAM PRODUCTS FOR ENCRYPTION KEY GENERATION AND MANAGEMENT

(71) Applicant: BicDroid Inc, Petersburg (CA)

(72) Inventor: En-Hui Yang, Petersburg (CA)

(73) Assignee: BICDROID INC., Petersburg, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/178,680

(22) Filed: Jun. 10, 2016

Related U.S. Application Data

(63) Continuation-in-part of application No. 14/737,940, filed on Jun. 12, 2015, and a continuation-in-part of
(Continued)

(51) Int. Cl.
*G06F 21/62* (2013.01)
*G06F 21/41* (2013.01)

(52) U.S. Cl.
CPC .......... *G06F 21/6218* (2013.01); *G06F 21/41* (2013.01)

(58) Field of Classification Search
CPC .... G06F 21/6218; G06F 21/41; G06F 21/602; H04L 9/0869; H04L 9/0894; H04L 9/0897
See application file for complete search history.

(56) References Cited

U.S. PATENT DOCUMENTS 5,241,599 A * 8/1993 Bellovin ............... H04L 9/0844
380/28
5,297,207 A 3/1994 Degele
(Continued)

FOREIGN PATENT DOCUMENTS

EP 2571192 3/2013

OTHER PUBLICATIONS

Iida et al., An Intrusion and Random-Number-Leakage Resilient Scheme in Mobile Unattended WSNs, Apr. 2012, International Conference on Advanced Information Networking and Applications Workshops, pp. 552-557.*
(Continued)

*Primary Examiner* — Kenneth Chang
(74) *Attorney, Agent, or Firm* — Bereskin & Parr LLP/S.E.N.C.R.L., s.r.l.; Ian C. McMillan

(57) ABSTRACT

The described embodiments relate to encryption methods and computer program products. An encryption application is used to determine a keystore seed with a seed bit set having seed bits in an ordered sequence. A plurality of key derivation sets are determined and a selected key derivation set is selected randomly. A key bit sequence is generated from the seed bit set using the selected key derivation set. An encryption key is generated using the key bit sequence, and corresponding keying information is determined from the selected key derivation set such that the latter is also derivable from the former. The keying information discloses zero information about the encryption key absent knowledge of the keystore seed. Plaintext data is encrypted using the encryption key to generate ciphertext data, and the keying information is stored with the ciphertext data. The encryption key may then be deleted.

24 Claims, 5 Drawing Sheets

Related U.S. Application Data application No. PCT/CA2015/050543, filed on Jun. 12, 2015.

(60) Provisional application No. 62/011,837, filed on Jun. 13, 2014.

(56) References Cited

U.S. PATENT DOCUMENTS

| | | | |
|---|---|---|---|
| 5,455,862 A | 10/1995 | Hoskinson | |
| 5,937,066 A * | 8/1999 | Gennaro | H04L 9/0841 380/286 |
| 6,141,420 A * | 10/2000 | Vanstone | G06F 7/725 380/28 |
| 7,634,087 B2 * | 12/2009 | Boneh | H04L 9/0847 380/277 |
| 8,588,410 B2 | 11/2013 | McCullough et al. | |
| 2002/0131592 A1 | 9/2002 | Hinnant | |
| 2003/0210787 A1 | 11/2003 | Billhartz et al. | |
| 2004/0019619 A1 | 1/2004 | Buer et al. | |
| 2004/0059913 A1 | 3/2004 | de Jong | |
| 2005/0223216 A1 | 10/2005 | Chan et al. | |
| 2006/0177061 A1 | 8/2006 | Orsini et al. | |
| 2007/0067833 A1 | 3/2007 | Colnot | |
| 2008/0175377 A1 | 7/2008 | Merrill | |
| 2009/0288148 A1 | 11/2009 | Headley et al. | |
| 2010/0017603 A1 * | 1/2010 | Jones | H04L 9/0844 713/168 |
| 2010/0254533 A1 | 10/2010 | McCullough et al. | |
| 2011/0154041 A1 | 6/2011 | Godfrey et al. | |
| 2011/0307699 A1 | 12/2011 | Fielder | |
| 2012/0233460 A1 * | 9/2012 | Kamara | H04L 9/3218 713/168 |
| 2013/0080765 A1 | 3/2013 | Mohanty et al. | |
| 2013/0124855 A1 | 5/2013 | Varadarajan et al. | |
| 2013/0227651 A1 | 8/2013 | Schultz et al. | |
| 2014/0040622 A1 | 2/2014 | Kendall et al. | |
| 2015/0178515 A1 | 6/2015 | Cooley et al. | |

OTHER PUBLICATIONS

Non-Final Office Action of corresponding U.S. Appl. No. 14/737,940 dated Oct. 19, 2016.

International Search Report and the Written Opinion for corresponding application No. PCT/CA2015/050543, dated Sep. 15, 2015.

International Search Report and Written Opinion from the corresponding PCT Application No. PCT/CA2016/050663 dated Jul. 26, 2016.

Non-Final Office Action of U.S. Appl. No. 14/738,013 dated Sep. 1, 2016.

Notice of Allowance for corresponding U.S. Appl. No. 14/737,940 dated Feb. 3, 2017.

Chowdhury et al., Stochastic Seed Based Cryptographic Technique [SSCT] Using Dual Formula Key [DFK], Dec. 2011, International Conference on Communication and Industrial Application, pp. 1-5.

* cited by examiner

METHODS AND COMPUTER PROGRAM PRODUCTS FOR ENCRYPTION KEY GENERATION AND MANAGEMENT

RELATED APPLICATIONS

This application is a continuation-in-part of U.S. patent application Ser. No. 14/737,940 filed Jun. 12, 2015, entitled "METHODS, SYSTEMS AND COMPUTER PROGRAM PRODUCT FOR PROVIDING ENCRYPTION ON A PLURALITY OF DEVICES", and PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" each of which claims priority from the U.S. Patent Application No. 62/011,837, filed Jun. 13, 2014 entitled "QUARANTINED SECURITY SYSTEMS FOR DATA PROTECTION AND SYNCHRONIZATION AND SHARING OF ENCRYPTED FILES". The entire disclosures of PCT Patent Application No. PCT/CA2015/050543, U.S. patent application Ser. No. 14/737,940, and U.S. Patent Application No. 62/011,837 are incorporated herein by reference.

FIELD

Embodiments of the present invention relate generally to data protection and encryption, and more specifically to methods and computer program products for generating and managing encryption keys.

BACKGROUND

As people become more reliant on computing and Internet technologies, data security is becoming more important than ever. In applications of data storage and communications, such as cloud storages and wireless sensor networks, data encryption is critical to the protection of privacy and sensitive information.

With Internet connections becoming ubiquitous, it is relatively easy to access and distribute data widely through the use of clouds. To enjoy the benefits of cloud computing, people and companies often upload their data to cloud servers. This often includes private or confidential data, or any data a user might want to protect. This increases the chance for private and important data to become unnecessarily exposed if it is left unprotected.

Typically, people rely on cloud service providers to ensure the security of their data. However, cloud storage may have a number of associated security vulnerabilities. In its 2013 report ("The notorious nine: Cloud computing top threats in 2013," http://www.cloudsecurityalliance.org/topthreats), the Cloud Security Alliance identified nine top security threats to cloud computing including data breaches, data loss, malicious insiders, and shared technology issues. Such data security issues are undesirable, and may slow the uptake of cloud services.

One way to mitigate data security issues is by way of encryption. For example, stand-alone tools such as Winzip and secure PDF may be used to encrypt files before those files are saved and stored, uploaded, and/or transmitted. Without the corresponding decryption key, the encrypted file may not be meaningful.

Using stand-alone tools such as Winzip and secure PDF to encrypt multiple files in a folder, however, has several drawbacks. For example, a user may be required to input a password to encrypt every file, and to input a corresponding password to decrypt the encrypted file for viewing and/or modification. When the number of files increases, this approach becomes tedious and is not user-friendly. As well, the user may easily become confused about which password decrypts which file if different passwords are used to encrypt different files.

Furthermore, the encryption strength in these examples depends on how strong the passwords chosen by the user are. Because of the difficulty users experience in coming up with and memorizing strong random passwords, they tend to choose weaker passwords, and the resulting encryption can often be weak. As a result, files encrypted using stand-alone tools may still be vulnerable to sophisticated attacks. Furthermore, if passwords are forgotten or lost, it may be difficult or impossible to recover the original plaintext files from the encrypted files. This effectively results in a permanent loss of data. Finally, when files are encrypted using stand-alone tools, sharing encrypted files among a group of people can be tedious and often requires the use of side channels to exchange passwords.

In large scale information systems, key management including key generation, exchange and maintenance of secrecy of the secret keys, becomes even more difficult. As such, it is desirable to develop a solution to mitigate key management challenges while achieving strong security in some information theoretic sense.

SUMMARY

In accordance with an embodiment described herein, there is provided an encryption method. The encryption method may include providing an encryption application for installation on a computing device; operating the encryption application to determine a keystore seed having a seed bit set with L seed bits in an ordered sequence where L is an integer greater than 3, where each seed bit in the seed bit set has a seed bit position in the ordered sequence, and the L seed bits in the seed bit set are independent and identically distributed; and storing the keystore seed on the computing device using the encryption application. The method may further include operating the encryption application to determine a plurality of key derivation sets, where each key derivation set includes at least one key derivation value; randomly selecting a selected key derivation set from the plurality of key derivation sets; and operating the encryption application to generate a key bit sequence having l bits from the seed bit set and the selected key derivation set, where l is a positive integer less than L. The method may further include generating an encryption key having u bits using the key bit sequence, where u is a positive integer not greater than l; determining keying information corresponding to the encryption key, the keying information being determined from the selected key derivation set, where the selected key derivation set is derivable from the keying information and where a mutual information amount between the encryption key and the keying information is zero such that the encryption key and the keying information are statistically independent, and the keying information can disclose zero information about the encryption key absent knowledge of the keystore seed. The method may further include receiving, by the encryption application, plaintext data; operating the encryption application to generate ciphertext data by encrypting the plaintext data using the encryption key; and storing the ciphertext data and the corresponding keying information using the encryption application.

In some embodiments, the method may further include receiving second ciphertext data at the computing device;

receiving second keying information at the computing device, the second keying information corresponding to the second ciphertext data and to the keystore seed; determining by the encryption application, a second key derivation set from the second keying information; generating a second key bit sequence having l bits from the seed bit set and the second key derivation set; generating a second encryption key having u bits using the second key bit sequence, where u is less than or equal to l; and generating second plaintext data by decrypting the second ciphertext data using the second encryption key.

In some embodiments, the at least one key derivation value in each key derivation set may include a set of t distinct seed bit positions in the ordered sequence, and the plurality of key derivation sets can be determined to include all possible sets of t distinct seed bit positions in the ordered sequence, where t is a integer greater than or equal to 1.

In some embodiments, generating the key bit sequence having l bits from the seed bit set and the selected key derivation set may include determining a plurality of derived seed bit sequences from the seed bit set, the plurality of derived seed bit sequences including one derived seed bit sequence for each of the t distinct seed bit positions in the selected key derivation set, where each derived seed bit sequence includes l consecutive bits from the seed bit set, and the l consecutive bits for each derived seed bit sequence begin from the seed bit having the seed bit position equal to the corresponding distinct seed bit position in the selected key derivation set and includes the l−1 successive seed bits in a cycle of the ordered sequence; and determining the key bit sequence as a linear function of the derived seed bit sequences in the plurality of derived seed bit sequences.

In some embodiments, generating the key bit sequence having l bits from the seed bit set and the selected key derivation set may include generating the key bit sequence $k(m_1, m_2, \ldots, m_t)$ according to $$k(m_1, m_2, \ldots, m_t) = \sum_{i=1}^{t} K(m_i)K(m_i+1)\ldots K(m_i+l-1)$$

where each derived seed bit sequence is determined by $K(m_i)K(m_i+1)\ldots K(m_i+l-1)$ and the selected key derivation set is defined as $0 \leq m_1 < m_2 < \ldots \leq m_t \leq L-1$.

In some embodiments, each key derivation set may be a binary matrix of size l×L with rank of l, and the plurality of key derivation sets can be determined to include a plurality of binary matrices of size l×L with rank of l such that the module 2 addition of any two of the binary matrices in the plurality of binary matrices is also of rank l.

In some embodiments, generating the key bit sequence having l bits from the seed bit set and the selected key derivation set may include generating a key column vector of dimension l by multiplying the selected key derivation set as a binary matrix of size l×L by the keystore seed defined as a seed column vector of dimension L; and determining the key bit sequence as the key column vector.

In some embodiments, generating the key bit sequence having l bits from the seed bit set and the selected key derivation set can include generating the key bit sequence k according to $$k^T = AK^T$$

where the selected key derivation set is the binary matrix A of size l×L with rank of l, $K=(K(0), K(1), \ldots, K(L-1))$ is a seed row vector of dimension L including the seed bits at their seed bit position in the ordered sequence, $K^T$ is the transpose of K and $k^T$ is the transpose of k.

In some embodiments, generating the encryption key having u bits using the key bit sequence may include determining the encryption key to be the key bit sequence.

In some embodiments, generating the encryption key having u bits using the key bit sequence may include determining a hashed key bit sequence by applying a hash function to the key bit sequence; and determining the encryption key to be the hashed key bit sequence.

In some embodiments, the method may further include providing the encryption application for installation on a second computing device; operating the encryption application on the second computing device to determine the keystore seed having the seed bit set; storing the keystore seed having the seed bit set on the second computing device using the encryption application; receiving at the second computing device the ciphertext data and the keying information; operating the encryption application on the second computing device to determine the selected key derivation set from the keying information; operating the encryption application on the second computing device to determine the key bit sequence from the seed bit set stored on the second computing device and the selected key derivation set; operating the encryption application on the second computing device to generate the encryption key using the key bit sequence; and operating the encryption application on the second computing device to generate the plaintext data by decrypting the ciphertext data using the encryption key.

In some embodiments, the method may further include deleting the encryption key and the key bit sequence from the computing device each time after a particular ciphertext data is generated or decrypted.

In accordance with an embodiment described herein, there is provided a computer program product including a computer readable medium having computer executable instructions stored thereon, the instructions for configuring a processor of a computing device to: determine a keystore seed having a seed bit set with L seed bits in an ordered sequence where L is an integer greater than 3, where each seed bit in the seed bit set has a seed bit position in the ordered sequence, and the L seed bits in the seed bit set are independent and identically distributed; store the keystore seed on the computing device; determine a plurality of key derivation sets, each key derivation set including at least one key derivation value; randomly select a selected key derivation set from the plurality of key derivation sets; generate a key bit sequence having l bits from the seed bit set and the selected key derivation set, where l is a positive integer less than L; generate an encryption key having u bits using the key bit sequence, where u is a positive integer not greater than l; determine keying information corresponding to the encryption key, the keying information being determined from the selected key derivation set, where the selected key derivation set is derivable from the keying information and a mutual information amount between the encryption key and the keying information is zero such that the encryption key and the keying information are statistically independent, and the keying information discloses zero information about the encryption key absent knowledge of the keystore seed; receive plaintext data; generate ciphertext data by encrypting the plaintext data using the encryption key; and store the ciphertext data and the corresponding keying information.

In some embodiments, the computer program product may further include instructions for configuring the processor to: receive second ciphertext data at the computing device; receive second keying information at the computing device, the second keying information corresponding to the second ciphertext data and to the keystore seed; determine a second key derivation set from the second keying information; generate a second key bit sequence having l bits from the seed bit set and the second key derivation set; generate a second encryption key having u bits using the second key bit sequence, where u is less than or equal to l; and generate second plaintext data by decrypting the second ciphertext data using the second encryption key.

In some embodiments, the at least one key derivation value in each key derivation set can include a set of t distinct seed bit positions in the ordered sequence, and the plurality of key derivation sets can be determined to include all possible sets of t distinct seed bit positions in the ordered sequence, where t is an integer greater than or equal to 1.

In some embodiments, the computer program product may further include instructions for configuring the processor to: generate the key bit sequence having l bits from the seed bit set and the selected key derivation set by: determining a plurality of derived seed bit sequences from the seed bit set, the plurality of derived seed bit sequences including one derived seed bit sequence for each of the t distinct seed bit positions in the selected key derivation set, where each derived seed bit sequence includes l consecutive bits from the seed bit set, and the l consecutive bits for each derived seed bit sequence begin from the seed bit having the seed bit position equal to the corresponding distinct seed bit position in the selected key derivation set and includes the l−1 successive seed bits in a cycle of the ordered sequence; and determining the key bit sequence as a linear function of the derived seed bit sequences in the plurality of derived seed bit sequences.

In some embodiments, the computer program product may further include instructions for configuring the processor to: generate the key bit sequence having l bits from the seed bit set and the selected key derivation set by generating the key bit sequence $k(m_1, m_2, \ldots, m_t)$ according to $$k(m_1, m_2, \ldots, m_t) = \sum_{i=1}^{t} K(m_i)K(m_i+1) \ldots K(m_i+l-1)$$

where each derived seed bit sequence is determined by $K(m_i)K(m_i+1) \ldots K(m_i+l-1)$ and the selected key derivation set is defined as $0 \leq m_1 < m_2 < \ldots < m_t \leq L-1$.

In some embodiments, each key derivation set may be a binary matrix of size l×L with rank of l, and the plurality of key derivation sets can be determined to include a plurality of binary matrices of size l×L with rank of l such that the module 2 addition of any two of the binary matrices in the plurality of binary matrices is also of rank l.

In some embodiments, the computer program product may further include instructions for configuring the processor to: generate the key bit sequence having l bits from the seed bit set and the selected key derivation set by: generating a key column vector of dimension l by multiplying the selected key derivation set as a binary matrix of size l×L by the keystore seed defined as a seed column vector of dimension L; and determining the key bit sequence as the key column vector.

In some embodiments, the computer program product may further include instructions for configuring the processor to: generate the key bit sequence having l bits from the seed bit set and the selected key derivation set by generating the key bit sequence k according to $$k^T = AK^T$$

where the selected key derivation set is the binary matrix A of size l×L with rank of l, $K=(K(0), K(1), \ldots, K(L-1))$ is a row vector of dimension L including the seed bits at their seed bit position in the ordered sequence, $K^T$ is the transpose of K and $k^T$ is the transpose of k.

In some embodiments, the computer program product may further include instructions for configuring the processor to: generate the encryption key having u bits using the key bit sequence by determining the encryption key to be the key bit sequence.

In some embodiments, the computer program product may further include instructions for configuring the processor to: generate the encryption key having u bits using the key bit sequence by: determining a hashed key bit sequence by applying a hash function to the key bit sequence; and determining the encryption key to be the hashed key bit sequence.

In some embodiments, the computer program product may further include instructions for configuring a second processor of a second computing device to: determine the keystore seed having the seed bit set at the second computing device; store the keystore seed having the seed bit set on the second computing device; receive at the second computing device the ciphertext data and the keying information; determine the selected key derivation set from the keying information at the second computing device; determine the key bit sequence from the seed bit set stored on the second computing device and the selected key derivation set; generate the encryption key at the second computing device using the key bit sequence; and generate the plaintext data at the second computing device by decrypting the ciphertext data using the encryption key.

In some embodiments, the computer program product may further include instructions for configuring the processor to delete the encryption key and the key bit sequence from the computing device each time after a particular ciphertext data is generated or decrypted.

BRIEF DESCRIPTION OF DRAWINGS

For a better understanding of the described embodiments and to show more clearly how they may be carried into effect, reference will now be made, by way of example, to the accompanying drawings in which.

Figure 1A:
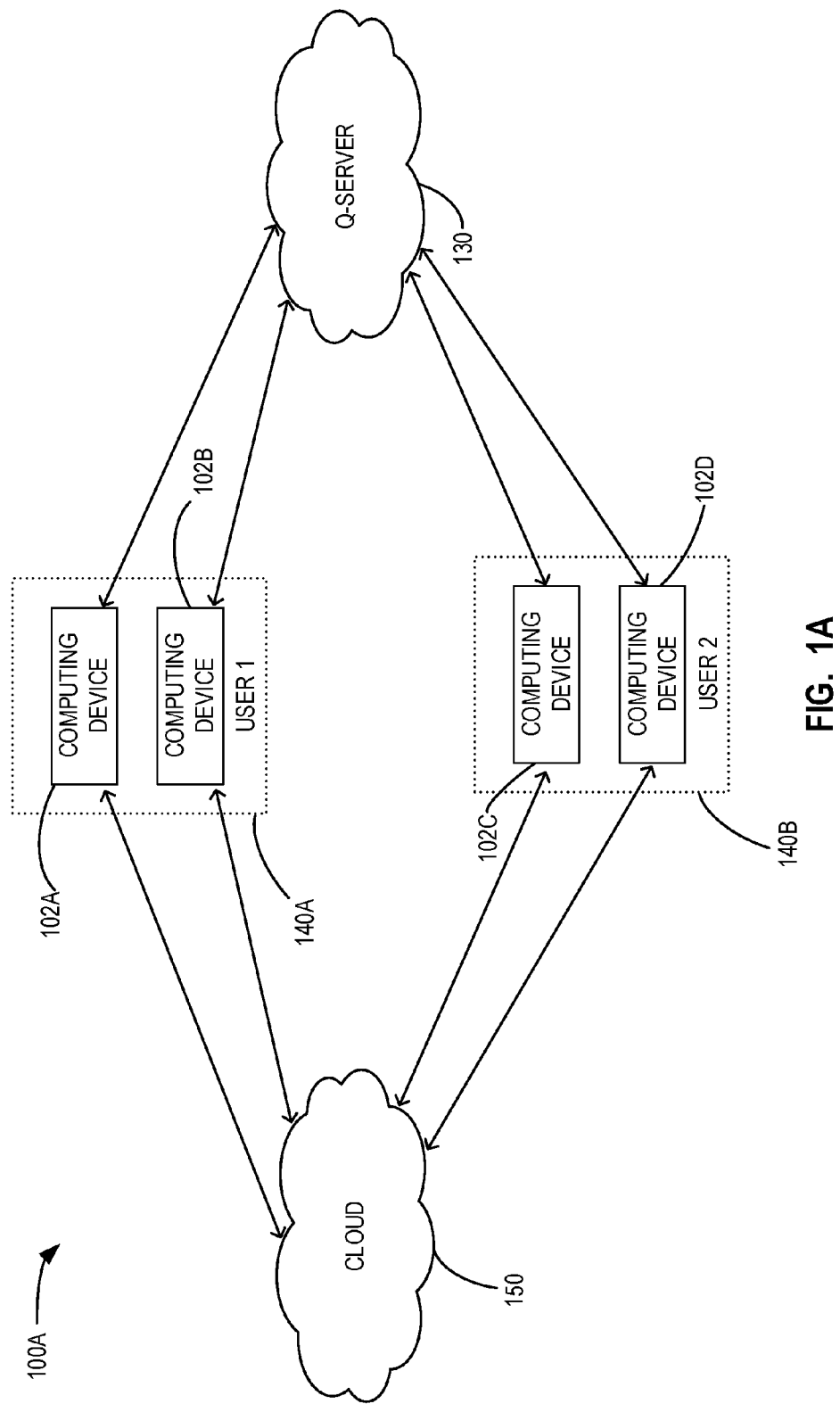
FIG. 1A shows a block diagram of a system that can be used to provide encryption key generation and management for a computing device in accordance with an embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be

DETAILED DESCRIPTION

Various systems or methods will be described below to provide an example of an embodiment of the claimed subject matter. No embodiment described below limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described below is not an embodiment that is recited in any claimed subject matter. Any subject matter disclosed in a system or method described below that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the drawings and the description is not to be considered as limiting the scope of the embodiments described herein.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Described herein are various embodiments of systems, methods, computer program products, and devices for providing data protection. In general, the embodiments described herein provide methods for generating encryption keys for securely encrypting files. The embodiments described herein also provide methods for generating corresponding decryption keys for decrypting the encrypted files. In general, the embodiments described herein relate to the generation of symmetric encryption keys, where the encryption key and the decryption key are the same. In general, features of the various embodiments described herein can be used in any combination with one another except where otherwise noted.

Embodiments described herein may address problems associated with key generation and management. In particular, embodiments described herein may be used to provide one-file-one-key secure data encryption (also called practical one-time pad), where individual files can each be encrypted using a unique key.

The embodiments herein may be described using a concept referred to as information-theoretical $\epsilon$-security to measure the security of a set of keys. As used herein, the term keystore generally refers to a set of random keys, $k_i, 1 \le i \le \Lambda$, each having length of l bits. A keystore can be generated from a string of L bits (typically a random string), which may be referred to as a keystore seed or key seed.

Embodiments described herein may provide efficient methods for generating a keystore using a keystore seed. In particular, some embodiments described herein may use a hash function in generating a keystore. Such a keystore may be referred to as a hashed keystore. A hashed keystore may be denoted herein in some examples by $\phi(\Psi) = \{\phi(k_i): 1 \le i \le \Lambda\}$. Alternative embodiments may generate a keystore without using a hash function. Such alternative keystores may be referred to as non-hashed keystores. Examples of non-hashed keystores may be denoted herein by $\Psi = \{k_i: 1 \le i \le \Lambda\}$.

Embodiments described herein can be shown to be information-theoretically $\epsilon$-secure with small $\epsilon$. Specifically, embodiments described herein may satisfy the following properties:

(Property 1) Embodiments described herein may provide a keystore having a key capacity $\Lambda$ (i.e. a number of keys in the keystore) substantially greater than a bit size L of the keystore seed. The keystore seed generally consists of a set of bits, referred to as a seed bit set. The number of bits in the seed bit set is then the keystore seed bit size. For examples of hashed and non-hashed keystores described herein, $\Lambda \gg L$ may be sufficiently large to realize one-file-one-key encryption for a large-scale multiple-user information system.

(Property 2) Embodiments described herein may provide keys having a plurality of key bits with the key bits uniformly distributed over a key space. That is, for any key index i, the key $k_i$ may be uniformly distributed over the key space $\{0,1\}^l$. The embodiments described herein may also provide methods for generating keys where there is zero mutual information between the key and corresponding keying information or key index. The key $k_i$ may thus be statistically independent of the key index i (e.g. if i is chosen randomly).

(Property 3) Embodiments described herein may provide a keystore with a low probability of key collisions. Key collisions generally refers to two different keys (i.e. keys corresponding to different keying indexes or keying information) being identical. That is, for any two independent i,j, $1 \le i,j \le \Lambda$, the probability that $k_i = k_j$ may be very small (less than $(1-\epsilon) \times 2^{-1} + \epsilon$).

(Property 4) Embodiments described herein may provide methods for generating a plurality of encryption keys from a keystore seed such that for any two independent key indices i and j, knowing i, j, and $k_i$ does not reduce the amount of uncertainty about $k_j$ significantly. In the embodiments described herein, the conditional Shannon entropy $H(k_j|i,j,k_i)$ may be at least as large as $(1-\epsilon)H(k_j|j)$. With $L=2^{16}$ and $l=256$, examples described herein illustrate that $\Lambda$ can be greater than $2^{138}$ and E can be less than $8.205 \times 10^{-12}$.

The above-noted properties of keystores (e.g. $\Psi$ and/or $\phi(\Psi)$) in embodiments described herein may enable practical applications of one-time pad for large-scale data communications and storage systems. Embodiments described herein may also provide simple and efficient methods for generating keys $k_i$ from the keystore seed and sets of key derivation values or key index values i. Accordingly, embodiments described herein may minimize some of the challenges associated with distributing and managing a large set of random encryption keys.

In applications of data storage and communications, such as cloud storages and wireless sensor networks, data encryption is critical to the protection of privacy and sensitive information. Various encryption ciphers are available, such as the Advanced Encryption Standard (AES) (see, for example, Advanced Encryption Standard (AES), Federal Information Processing Standards (FIPS) Publication 197, United States National Institute of Standards and Technology (NIST), 2001), and users may choose a particular encryption scheme based on the nature of their business and the confidentiality requirements of the data being stored and/or transmitted. In large scale information systems, key management, such as key generation, exchange and maintenance of secrecy of the secret keys, can be an extremely difficult problem (see, for example, Z. Philip, *PGP Source Code and Internals*. MIT Press, 1995; W. Stallings, *Cryptography and Network Security: Principles and Practices*, (6th Ed.). Prentice Hall, Boston, 2011; E.-H. Yang, J. Meng, and X. Yu, "Methods, systems and computer program product for providing encryption on a plurality of devices," U.S. patent application Ser. No. 14/737,940, Jun. 12, 2015).

In some currently available security protocols, including PGP (see Z. Philip, *PGP Source Code and Internals*. MIT Press, 1995) and SSL (Netscape Corporation, "The SSL Protocol," 1997), symmetric algorithm based ciphers (e.g., AES) are used to encrypt and decrypt data. Asymmetric (or public-key) cryptographic algorithms (see, for example, I. F. Blake, G. Seroussi, and N. P. Smart, *Elliptic Curves in Cryptography*. Cambridge University Press, 1999; A. J. Menezes, P. C. van Oorschot, and S. A. Vanstone, *Handbook of Applied Cryptography*. CRC Press, 1996; B. Schneier, *Applied Cryptography*. Wiley, New York, 1995; W. Stallings, *Cryptography and Network Security: Principles and Practices*, (*6th Ed.*). Prentice Hall, Boston, 2011), such as the RSA algorithm (R. L. Rivest, A. Shamir, and L. Adleman, "A method for obtaining digital signatures and public-key cryptosystems," *Comm. ACM*, vol. 21, no. 2, pp. 120-126, February 1978), Diffie-Hellman (W. Diffie and M. Hellman, "New directions in cryptography," *IEEE Transactions on Information Theory*, vol. 22, no. 6, pp. 644-654, November 1976) and ElGamal methods (T. ElGamal, "A public-key cryptosystem and a signature scheme based on discrete logarithms," *IEEE Transactions on Information Theory*, vol. 31, no. 4, pp. 469-472, July 1985), can be used for key exchange (or digital signatures). These methods provide a solution to the key-exchange problem for data encryption during data transmission while achieving computational security due to the difficulties associated with large integer factorization and discrete logarithms.

However, such methods may be vulnerable in situations where sensitive data is stored long-term/permanently, where an attacker has sufficient time to intercept as much information as possible or has extremely powerful computational capability (to crypto analyze the encryption/decryption keys). In such cases, the use of a secret key to encrypt many files or data items during a period of time (such a secret key is called a session key), as operated in PGP and SSL, may be vulnerable to attack. As such, it may be preferable for every file or data item to be encrypted using a unique key. As used herein, such an encryption method may be referred to as a one-file-one-key method. Embodiments of one-file-one-key methods described herein may provide implementations that are an extension from the idea of one-time pad (OTP) (see, for example, C. Shannon, "Communication theory of secrecy systems," Bell System Technical Journal 28 (4): 656-715, 1949).

For data confidentiality, one-file-one-key methods may provide the advantage that even if a file or data item is intercepted and broken (or, in a worse case, a storage component is compromised), it may still be difficult for an attacker to break and understand other files/data items, as they are encrypted using different keys. However, one-file-one-key methods result in challenges for key management as a large number of keys have to be generated, exchanged or distributed, and managed securely. For practical implementations of a one-file-one-key method, embodiments described herein may provide solutions to one or more of the following problems:

1) How to effectively generate a large set of keys?
2) How to ensure that the generated keys are uniformly distributed over the key space?
3) If keying materials (such as key indices) used to extract the key for decryption are placed in the file header of an encrypted file to facilitate key distribution, how to ensure that the keying materials do not disclose any information about the key, i.e., the mutual information between the key and keying materials is zero?
4) How to ensure that breaking one key does not gain any significant information about other keys, i.e., the mutual information between distinct keys are near zero?

Existing key exchange procedures based on asymmetric cryptographic algorithms such as PGP and other security protocols such as SSL do not offer desirable solutions to the problems mentioned above. For example, in PGP and SSL, a session key $k_s$ is first encrypted using the public key (referred to as KU) of the legitimate receiving party. The encrypted key $E_{KU}(k_s)$ is then transmitted through an unprotected medium (for example, placed in the file header of an encrypted file). Upon receiving the encrypted key $E_{KU}(k_s)$, the legitimate receiving party uses its private key to extract the key $k_s$ from $E_{KU}(k_s)$. In this case, $E_{KU}(k_s)$ essentially serves as keying information for the key $k_s$. Although the key $k_s$ can be generated randomly (at least in theory), the keying information $E_{KU}(k_s)$ discloses all information about the key $k_s$ from an information theoretic perspective. Indeed, since the public key KU is known, the mutual information $I(E_{Ku}(k_s);k_s)$ between the key $k_s$ and keying information $E_{KU}(k_s)$ is equal to the length of the key $k_s$. This is in contrast with the requirement mentioned in Problem 3) above.

Embodiments described herein may provide methods and computer program products for generating encryption keys that can address the above-noted problems. In embodiments described herein, legitimate communicating parties can share a common random string of L bits, which is denoted by K. K is generally referred to as a keystore seed comprising a seed bit set with L seed bits. L is an integer value, and will typically be greater than at least 3. Various examples of values for L will be discussed further below.

The seed bit set will generally include the L bits in an ordered sequence. That is, each seed bit in the seed bit set can have a corresponding seed bit position in the ordered sequence. While the seed bit set may be a random string of L bits, the ordered sequence may be treated as a cycle of module L. As mentioned, the seed bits in the ordered sequence can be randomly determined. Accordingly, the seed bits in the seed bit set can be independent and identically distributed.

As mentioned, the legitimate communicating parties (i.e. users) to an exchange of data generally share the same seed bit set. Users may synchronize the keystore seed (i.e. the seed bit set) manually or automatically. Examples of systems and methods for synchronizing keystore seeds between devices are described in greater detail in the Applicant's U.S. patent application Ser. No. 14/737,940 filed Jun. 12, 2015, entitled "METHODS, SYSTEMS AND COMPUTER PROGRAM PRODUCT FOR PROVIDING ENCRYPTION ON A PLURALITY OF DEVICES" which has now been published as US2015/0363607A1 and Applicant's PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" now published as PCT Patent Publication No. WO2015/188277.

Embodiments described herein may provide a simple and efficient process for generating a plurality of random keys for data encryption and decryption (for simplicity the keys may be referred to herein as encryption keys, although such keys may be used for both encryption and decryption) from a keystore seed K of L seed bits. The keys (e.g. $\phi(k_i)$ or $k_i, 1 \leq i \leq \Lambda$) can each be generated to have a key length of l bits where $\Lambda \gg L$. The set of encryption keys (e.g. $\phi(k_i)$ or $k_i, 1 \leq i \leq \Lambda$) may be referred to herein as the keystore. The seed bit set or random string K may be referred to herein as the keystore seed or key seed. Some embodiments described herein may provide linear methods for easily generating an encryption key from K and i. Some embodiments described herein may use one-way or hash functions in generating encryption keys. The keys generated from the keystore seed K in embodiments described herein may be shown to be information-theoretically $\epsilon$-secure.

Embodiments described herein that satisfy Property 2 set out above facilitate distributing the key as the key may be statistically independent of its corresponding keying information. To distribute a key, the keying information (e.g. key index i) can be included in the file header of an encrypted file. Since the mutual information between the key and its keying information is zero, including the keying information in the file header discloses zero information about the key itself.

In addition, the key can be determined from the keystore seed K and the keying information i. Accordingly, managing a large set of random keys may be simplified as the keystore seed K can be managed instead. Thus practical implementations of one-time pad can be applied to large-scale data communications and storage systems, or to devices having limited storage capacity such as an increasing number of devices being connected through the Internet of Things.

Embodiments described herein satisfying Properties (1) to (4) provide methods for key generation and management that can be substantially secure against almost any attack on individual files or keys. As mentioned above, some embodiments described herein may generate keys using linear operations from the seed bit set of the keystore seed. That is, one or more key bit sequences may be derived from the seed bit set using linear functions and then used to generate the encryption keys.

However, in embodiments where keys are generated from the keystore seed K by linear operations, an attacker may attempt to reconstruct the keystore seed K if the attacker acquired a significant number of keys. Such an attack can be referred to as a reconstruction attack. To prevent a reconstruction attack, some embodiments described herein may provide a reconstruction-prevention key generation method using a secure hash function $\phi$. Even if an attacker acquires a number of hashed keys, due to the security properties of the hash function, it will still be hard for the attacker to recover key bit sequences from the hashed keys. Thus, it may be infeasible to reconstruct K even if a plurality of hashed keys $\phi(k_i)$ are acquired.

Referring now to FIG. 1A, shown therein is an example of a system 100A that can be used for generating and managing encryption keys in accordance with an embodiment. In some embodiments, system 100A may form part of a security system that enables automatic encryption and decryption of data files on various computing devices 102.

Each of the computing devices 102 may be associated with a particular user 140. For instance, in system 100A a first user 140A has two associated computing devices 102A and 102B and a second user 140B has two associated computing devices 102C and 102D.

In general, the computing devices 102 include a processor, volatile and non-volatile memory, at least one network interface, and input/output devices. Computing devices 102 may include server computers, desktop computers, notebook computers, tablets, PDAs, smartphones, or other programmable computers. Computing devices 102 may also encompass any connected or "smart" devices capable of data communication, such as thermostats, air quality sensors, industrial equipment and the like. Increasingly, this encompasses a wide variety of devices as more devices become networked through the "Internet of Things". Examples embodiments of the computing devices 102 will be described in further detail with reference to FIG. 1B.

The computing devices 102 may include a connection with a network, such as a wired or wireless connection to the Internet. The network may be constructed from one or more computer network technologies, such as IEEE 802.3 (Ethernet), IEEE 802.11 and similar technologies.

The computing devices 102 may be connected to a cloud server 150 over a network such as the internet. Cloud server 150 generally refers to one or more server computers connected to a computing device 102 using a network such as the internet. The cloud server 150 generally includes a processor, volatile and non-volatile memory, and at least one network interface and may provide data storage services for the computing devices 102. Data stored on cloud server 150 may be accessible by the computing devices 102 using the network.

Q-server 130 may also include one or more server computers connected to the computing devices 102 over a network such as the internet. The Q-server 130 generally includes a processor, volatile and non-volatile memory, and at least one network interface and may assist the computing devices 102 in various processes of encrypting and decrypting data. For example, the Q-server 130 may assist the computing devices 102 in generating new keystore seeds and/or synchronizing keystore seeds between different computing devices 102 and between different users 140. Further details of the operations of the Q-server 130 are described in the Applicant's U.S. patent application Ser. No. 14/737,940 filed Jun. 12, 2015, entitled "METHODS, SYSTEMS AND COMPUTER PROGRAM PRODUCT FOR PROVIDING ENCRYPTION ON A PLURALITY OF DEVICES" which has now been published as US2015/0363607A1 and Applicant's PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" now published as PCT Patent Publication No. WO2015/188277.

Figure 1B:
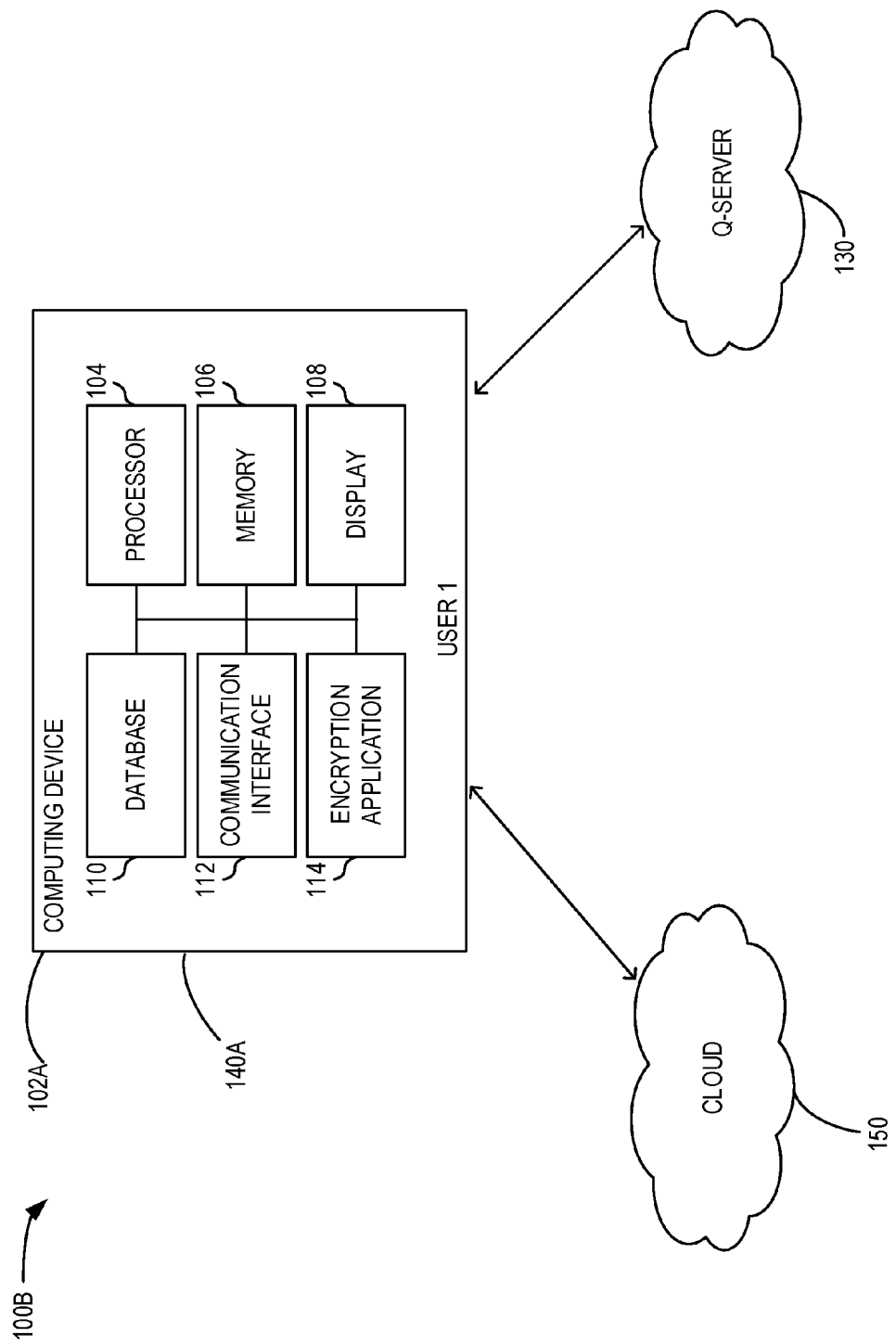
FIG. 1B shows a block diagram of another system that can be used to provide encryption key generation and management for a computing device in accordance with an embodiment.

Referring now to FIG. 1B, shown therein is an example system 100B that can be used for generating and managing encryption keys in accordance with an embodiment. In general, system 100B corresponds to system 100A and illustrates additional details of a computing device 102A associated with the first user 140A. The details of computing device 102A illustrating in system 100B may be generally extended to the various other computing devices 102 shown in FIG. 1A.

The computing device 102A generally includes a processor 104, a memory 106, a display 108, a database 110, and a communication interface 112. Although shown as separate elements, it will be understood that database 110 may be stored in memory 106.

The processor 104 is a computer processor, such as a general purpose microprocessor. In some other cases, processor 104 may be a field programmable gate array, application specific integrated circuit, microcontroller, or other suitable computer processor.

Processor 104 is coupled, via a computer data bus, to memory 106. Memory 106 may include both volatile and non-volatile memory. Non-volatile memory stores computer programs consisting of computer-executable instructions, which may be loaded into volatile memory for execution by processor 104 as needed. It will be understood by those of skill in the art that references herein to computing device 102 as carrying out a function or acting in a particular way imply that processor 104 is executing instructions (e.g., a software program) stored in memory 106 and possibly transmitting or receiving inputs and outputs via one or more interface. Memory 106 may also store data input to, or output from, processor 104 in the course of executing the computer-executable instructions. As noted above, memory 106 may also store database 110.

Processor 104 is also coupled to display 108, which is a suitable display for outputting information and data as needed by various computer programs. In particular, display 108 may display a graphical user interface (GUI). In some cases, the display 108 may be omitted from computing device 102, for instance where the computing device 102 is a sensor or other smart device configured to operate autonomously. Computing device 102 may execute an operating system, such as Microsoft Windows™, GNU/Linux, or other suitable operating system.

In some example embodiments, database 110 is a relational database. In other embodiments, database 110 may be a non-relational database, such as a key-value database, NoSQL database, or the like.

Communication interface 112 is one or more data network interface, such as an IEEE 802.3 or IEEE 802.11 interface, for communication over a network.

The processor 104 may operate based on instructions provided in applications stored in memory 106. As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

The computing device 102A may have stored thereon a software application referred to as an encryption application 114. Although shown separately, it should be understood that encryption application 114 may be stored in memory 106. The encryption application 114 may also be referred to as a Q-Agent or encryption agent installed on the computing device 102.

Each computing device 102 may have an encryption application 114 installed thereon. The encryption application 114 installed on each device 102 may be responsible for the encryption and decryption operations on that device 102. The encryption application 114 may also generate encryption/decryption keys and protect the keys once generated. The encryption application 114 may also generate one or more keystore seeds which can be stored on each device 102. The keystore seeds can be used by the encryption application 114 to generate one or more encryption/decryption keys.

The encryption application 114 can be used to generate keystore seeds. The keystore seeds can then be used to derive keys as will be described in further detail below. In some cases, the keystore seeds may be generated through communication between a particular encryption application 114 and Q-Server 130. In some cases, there may be no direct communication between and among the encryption application 114 on different devices 102. In such cases, the keystore seeds may need to be synchronized between different computing devices 102, either manually or automatically. The Q-Server 130 may be used to automatically synchronize the keystore seeds used on the devices 102, as described in the Applicant's U.S. patent application Ser. No. 14/737,940 filed Jun. 12, 2015, entitled "METHODS, SYSTEMS AND COMPUTER PROGRAM PRODUCT FOR PROVIDING ENCRYPTION ON A PLURALITY OF DEVICES" which has now been published as US2015/0363607A1 and Applicant's PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" now published as PCT Patent Publication No. WO2015/188277. Synchronizing keystore seeds between different devices 102 may enable different devices to communicate ciphertext files between devices 102 in an information-theoretical ϵ-secure manner, while still providing for easy encryption and decryption of the ciphertext files.

In some cases, the first user 140A may wish to move encrypted files/ciphertext from the first device 102A to a second device 102B or to a device associated with second user 140B, such as device 102C. The first user 140A may transmit one or more encrypted files/ciphertext from the first device 102A to a second device 102B in various ways such as using cloud services, telecommunications networks or other file transfer mechanisms such as a USB or Firewire key. Once the files have been received at the second device 102B, it may be necessary to decrypt the files on the second device 102B.

To allow encrypted files/ciphertext that were encrypted by the encryption application 114 on the first device 102A to be decrypted by the encryption application 114 on the second device 102B, the keystore seed(s) used by the encryption application 114 on the first device 102A and second device 102B may be synchronized, either manually or automatically. Thus, the encryption application 114 on the second device 102B may be able to determine the encryption key for decrypting the received file using the keystore seed and keying information transmitted along with the received file. Furthermore, the data may be secure against decryption during transmission as the keying information and the encryption key may have zero mutual information, such that the keying information and the encryption key are statistically independent, which may prevent an attacker from determining the encryption key from the transmitted ciphertext and keying information alone.

In some cases, the encryption application 114 may be configured to generate a large set of encryption keys, i.e., an encryption keystore, from the keystore seeds. However, in some cases it may be undesirable for the computing device 102 to generate and store a large set of encryption keys, e.g. if the device 102 has limited storage capacity. Accordingly, the device 102 may store only the keystore seed and derive encryption keys from the keystore seed as needed. Example embodiments for deriving encryption keys from a keystore seed will be discussed in further detail below.

The encryption keys or keystore seeds can be stored in non-volatile device memory in encrypted format and protected by a verification code defined by the user. In some embodiments, the verification code may be known only to the user. Local authentication information can be generated based on the verification code and stored on a user's device. The authentication information can be used to authenticate a user attempting to access or modify encrypted files. In some cases, the verification code may not be determinable from any of the stored authentication information. Further details regarding secure storage of encryption keys and keystore seeds using a verification code are described in the Applicant's U.S. patent application Ser. No. 14/737,940 filed Jun. 12, 2015, entitled "METHODS, SYSTEMS AND COMPUTER PROGRAM PRODUCT FOR PROVIDING ENCRYPTION ON A PLURALITY OF DEVICES" which has now been published as US2015/0363607A1 and Applicant's PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" now published as PCT Patent Publication No. WO2015/188277.

Data managed by the example systems described herein may remain encrypted at all times when stored in non-volatile memory—whether on devices of the user or other devices, such as a cloud server 150. The embodiments described herein may also ensure that the plaintext files corresponding to the stored encrypted files can be seen and/or modified only inside installed encryption agents. The plaintext files may be accessible only after being decrypted upon request from the user and are only temporarily stored in the volatile memory of devices of the user while being accessed.

In some embodiments, each of the programmable computers may include an input device for entering information into the device. For example, the input device may be a keyboard, key pad, cursor-control device, touch-screen, camera, scanner or microphone. In some embodiments, input information may be received through the communication interface from other programmable computers over a network. In some embodiments, the computing devices may include a display device for presenting visual information. For example, the display device may be a computer monitor, a flat-screen display, a projector or a display panel. In some embodiments, the display device displays one or more files to the user that have been encrypted by an encryption agent in accordance with systems and methods described herein.

The embodiments of the systems, processes and methods described herein may be implemented in hardware or software, or a combination of both. Alternatively, these embodiments may also be implemented in computer programs executed on programmable computers each comprising at least one processor (e.g., a microprocessor), a data storage system (including volatile and non-volatile memory and/or storage elements), at least one input device, and at least one output device. For example and without limitation, the programmable computers (referred to below as devices, computing devices or servers) may be a personal computer, laptop, personal data assistant, cellular telephone, smartphone device, tablet computer, and/or wireless device. For any software components, program code is applied to input data to perform the functions described herein and generate output information. The output information is applied to one or more output devices, in known fashion.

Each software component or program may be implemented in a high level procedural or object oriented programming and/or scripting language to communicate with a computer system. However, the programs can be implemented in assembly or machine language, if desired. In any case, the language may be a compiled or interpreted language. Furthermore, the processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

As discussed above, the keystore seed K, includes a seed bit set with L seed bits. For example, the keystore seed can be generated as a random string of L bits. The seed bits in the seed bit set may be arranged in a ordered sequence where each seed bit has a seed bit position in the ordered sequence. Embodiments described herein provides methods for generating a large set of encryption and decryption keys, i.e., the keystore $$\Psi = \{k_i : 1 \leq i \leq \Lambda\}$$

where $\Lambda$ is a large number$\gg$L, and each $k_i$ is of length 1 bits.

The encryption application 114 can determine one or more keystore seeds for a computing device 102. In some cases, the keystore seeds may be imported from another device 102. For example where the first user 140A has previously generated key seeds on first device 102A, the first user 140A may import the same key seeds to the second device 102B. If the first user 140A has not yet generated key seeds on any other devices 102, then the encryption application 114 of the first device 102A can generate the key seeds.

The encryption application 114 on the first device 102A can generate one or more key seeds. In some cases, the key seeds can be generated through communication between the encryption application 114 and Q-Server 130. For example, the encryption application 114 may randomly generate a plurality of independent key seeds $K_1, K_2, \ldots, K_J$. Each key seed generally comprises a seed bit set including a plurality of seed bits in an ordered sequence.

The encryption application 114 can then store key seed information based on the plurality of key seeds in the non-volatile memory of the first device 102A. For example, the key seed information may be generated by encrypting the key seeds, and then storing the encrypted key seeds as the key seed information. In some cases, a verification code C can be used to encrypt the key seeds $K_1, K_2, \ldots, K_J$ into encrypted key seeds $E_C(K_1, K_2, \ldots, K_J)$. These encrypted key seeds $E_C(K_1, K_2, \ldots, K_J)$ can then be saved on the non-volatile memory of the first device 102A.

If a second device 102B has an encryption application 114 installed thereon and has key seeds generated and stored on that device 102B, the first user 140A may import the key seeds from the device 102B. In system 100A, the first user 140A can access the encryption application 114 on the device 102B to get a copy of the encrypted FED key seeds $E_C(K_1, K_2, \ldots, K_J)$ generated by that encryption application 114. The first user 140A can then transfer the copied key seeds to the encryption application 114 on the first device 102A. The encryption application 114 can then import the key seeds and store them in the non-volatile memory of the first device 102A.

To encrypt a file or plaintext data, a key (e.g. $k_1$) may be randomly selected or derived from the keystore using the encryption application 114. The selected key $k_i$ can then be used as the encryption key to encrypt the file or plaintext data using a symmetric cipher such as AES. Keying information corresponding to the selected key, such as the key index i, can be included with the encrypted ciphertext, e.g. in the header of the ciphertext. The keying information (e.g. key index i) and the ciphertext together form an encrypted file. Upon receiving an encrypted file (i.e. ciphertext data and corresponding keying information), the encryption application 114 of a legitimate receiving party can extract the key $k_i$ from the keystore K stored on the receiving computing device 102 using the associated keying information (e.g. key index i). The encryption application 114 can then use the key $k_i$ to decrypt the ciphertext and generate the corresponding plaintext data.

To provide practical and secure embodiments of one-file-one-key encryption, $\Lambda$ should be sufficiently large. In addition, it is desirable for embodiments of the keystore $\Psi$ and corresponding keys to be information-theoretically $\epsilon$-secure for sufficiently small E, as discussed below.

Definition 1

A keystore $\Psi=\{k_i: 1 \le i \le \Lambda\}$ of keys of length l generated from a keystore seed K is said to be information-theoretically $\epsilon$-secure for $0 \le \epsilon \le 1$, if the following security properties hold:

1) For any given keying index i, $1 \le i \le \Lambda$, the key bits of the corresponding key in the keystore $k_i$ is random and uniformly distributed over $\{0,1\}^l$.
2) For any two independent keying indices i,j, $1 \le i,j \le \Lambda$, the probability of a collision between the corresponding keys is low:

$$Pr\{k_i=k_j\} \le (1-\epsilon) \times 2^{-l}+\epsilon.$$

3) For any two independent keying indices i and j, $1 \le i,j \le \Lambda$, $$H(k_j|i,j,k_i) \ge H((k_j|j) \times (1-\epsilon) = l \times (1-\epsilon)$$

where H(X|Y) stands for the conditional Shannon entropy of random variable X given random variable Y.

Based on the first security property, the mutual information between the key $k_i$ and the key index i is zero when the key index or keying information is chosen randomly. Thus, the release of the keying information (i.e. the key index) does not disclose any information on the key absent knowledge of the keystore seed (i.e. if the keystore seed is unknown). The second security property indicates that randomly selecting keys from the keystore is essentially collision free. In turn, this implies that randomly generating keys from the keystore is essentially collision free for embodiments where encryption keys are generated as required. The third security property indicates that knowledge of one encryption key does not significantly reduce the uncertainty about other keys, i.e., independently selected keys from the keystore (or independently generated keys from a keystore seed) are essentially pair-wise independent.

Definition 2

A keystore $\Psi=\{k_i: 1 \le i \le \Lambda\}$ of keys of length l generated from a keystore seed K is said to be information-theoretically $\epsilon$-secure up to order n for $0 \le \epsilon \le 1$, if $\Psi$ satisfies the first two security properties in Definition 1 as well as the following security property:

3*) For any independent keying information (i.e. key indices j, $i_1, \ldots, i_n$, $1 \le j, i_1, \ldots, i_n \le \Lambda$), $$H(k_j|i_1, \ldots, i_n, j, k_{i_1}, \ldots, k_{i_n}) \ge H((k_j|j) \times (1-\epsilon) = l \times (1-\epsilon)$$

In some cases, the encryption application 114 may not derive all of the encryption keys from the key seeds to generate a keystore in advance. Storing all the encryption keys of the keystore may not be feasible in terms of the storage capacity of a computing device 102 and may also be prone to security threats when $\Psi$ is large enough. Accordingly, each key $k_i$ should be easily computed from K and i so that there is no need to actually store the entire keystore $\Psi$ and its corresponding encryption keys.

The encryption application 114 may derive the encryption keys from the key seeds only as needed, i.e. when receiving an indication of a file to be encrypted or decrypted. In such cases, the encryption application 114 may also store keying information along with the encrypted file that indicates how to derive the encryption key from the key seed information stored on the non-volatile memory of the first device. As well, the encryption application 114 may erase the derived encryption key from the first device 102A after the file is encrypted.

In some cases, the keystore $\Psi$ may be generated from the random key seeds $K_1, K_2, \ldots, K_J$ using any means such that for any two independent i and j, $1 \le i,j \le \Lambda$, the probability that a first encryption key is equal to a second encryption key $Pr\{k_i=k_j\}$ is not significantly larger than $1/\Lambda$. For example, the means used to generate the keystore from the random key seeds may essentially be collision-free. In some embodiments this may be referred to as property (1) of the keystore $\Psi$.

In some cases, the keystore $\Psi$ may be generated from the random seeds $K_1, K_2, \ldots, K_J$ such that for any $1 \le i \le \Lambda$, the key $k_i$ is more or less uniformly distributed and hence statistically independent of i. In such cases, disclosing information i may not reveal any essential information about $k_i$. In some embodiments this may be referred to as property (2) of the keystore $\Psi$.

In some cases, the keystore $\Psi$ may be generated from the random seeds $K_1, K_2, \ldots, K_J$ such that for any two independent i and j, $1 \le i,j \le \Lambda$, knowing i, j, and a single key $k_i$ does not reduce the amount of uncertainty about another key $k_j$ significantly, i.e., the conditional Shannon entropy $H(k_j|i, j, k_i)$ is close to $H(k_j|j)$. In such cases, knowing one key $k_i$ does not provide any essential information about another key $k_j$. In some embodiments this may be referred to as property (3) of the keystore $\Psi$.

A large $\Lambda$ may provide increased entropy regarding the keys generated. However, storing all the keys generated with a large value of $\Lambda$ may require a significant amount of storage space. This may not be desirable when the systems described herein are mobile devices or other devices with storage capacity constraints. In some cases, the keystore $\Psi$ may be generated from the random seeds $K_1, K_2, \ldots, K_J$ such that for any $1 \le i \le \Lambda$, it is easy to compute $k_i$ from the seeds $K_1, K_2, \ldots, K_J$ and the index i. In such cases, as mentioned above, there is no need to actually store $\Psi$ on the devices 102 of the first user 140A. This may be desirable particularly when $\Lambda$ is large. In some embodiments this may be referred to as property (4) of the keystore $\Psi$.

In some cases, the encryption application 114 may store one or more key seeds, where each key seed has a first bit length. The encryption application 114 may derive one or more encryption keys from the stored key seeds, where each of the derived encryption keys has a second bit length. In some embodiments, the second bit length can be shorter than the first bit length.

Embodiments described herein provide efficient methods by which a large keystore (i.e. a large set of encryption keys) can be generated from a random keystore seed, such that the keystore satisfies the properties presented in the above definitions.

The keystore seed K may be considered a random string of L bits. That is, the keystore seed includes a seed bit set having L seed bits. The L seed bits in the seed bit set may be positioned in an ordered sequence and may be represented as:

$$K=K(0)K(1) \ldots K(L-1)$$

Each seed bit $K(i)$, $i=0,1,\ldots,L-1$, in the seed bit set can be independent and identically distributed bits over a seed bit space, here $\{0,1\}$. That is, the seed bits in the seed bit set may have $$Pr\{K(i)=0\}=Pr\{K(i)=1\}=1/2$$

Accordingly, the seed bits may be said to be uniformly random.

Encryption keys having u bit can be generated from the keystore seed. For example, the encryption application 114 may determine a set of key derivation values. The encryption application 114 may determine a plurality of key derivation sets. Each key derivation set may be determined to include at least one key derivation value $m_i$. In some embodiments, the key derivation sets can be determined to include a plurality of key derivation values $m_1, m_2, \ldots m_t$ where $0 \le m_1 < m_2 < \ldots < m_t \le L-1$. The key derivation values may correspond to a set of t distinct seed positions in the ordered sequence of the keystore seed, where t is an integer value greater than or equal to one. In some particular embodiments, the plurality of key derivation sets can be determined so that all possible sets of t distinct seed bit positions in the ordered sequence are included in the plurality of key derivation sets.

The encryption application 114 can generate a key bit sequence having l bits, where l is a positive integer with l<L. The key bit sequence can be generated from the keystore seed K using the seed bit positions $m_1, m_2, \ldots, m_t$ from a selected key derivation set. In some cases, the key bit sequence can be generated using one or more derived seed bit sequences $K(m_i)K(m_i+1) \ldots K(m_i+l-1)$, where each derived seed bit sequence corresponds to one of the seed bit positions $m_i$ of the selected key derivation set. The key bit sequence can then be generated from the derived seed bit sequences.

In some embodiments a key bit sequence can be generated from a plurality of derived seed bit sequences as a linear function of the derived seed bit sequences. For example, a key bit sequence $k(m_1, m_2, \ldots, m_t)$ may be determined according to $$k(m_1,m_2,\ldots m_t)=\Sigma_{i=1}^{t}K(m_i)K(m_i+1)\ldots K(m_i+l-1) \quad (1)$$

where the summation of the derived seed bit sequences $K(m_i)K(m_i+1) \ldots K(m_i+l-1)$ is a bit-by-bit binary addition, and the addition of integers $m_i$ and j ($1 \le j \le l-1$) is with respect to module L.

The key bit sequence can be used by the encryption application to generate an encryption key. In some embodiments, the encryption key may be generated from a key bit sequence using linear operations. In some embodiments, the key bit sequence generated by the encryption application 114 may be used as the encryption key.

In this example, the keystore $\Psi$ (i.e. the set of keys that can be generated from the keystore seed) can be given by $$\Psi=\{k(m_1,m_2,\ldots,m_t):0\le m_1<m_2<\ldots<m_t\le L-1\} \quad (2)$$

In this example, the number of random encryption keys in the keystore $\Psi$ (i.e. the number of keys that can be generated from the keystore seed) is $$\Lambda = \binom{L}{t}.$$

In some embodiments, non-linear functions or a one-way function of the key bit sequence may also be used to generate an encryption key. For example, hashed key bit sequences may be generated by the encryption application 114 as will be discussed in further detail below.

Properties of Keystore

Some of the security properties of the generated keystore $\Psi$ will now be described.

In embodiments where the relationship between the keystore seed, the key bit size and the set of distinct seed bit positions in the selected key derivation set is defined as $L>2t(l-1)$, a keystore $\Psi=\{k_i: 1 \le i \le \Lambda\}$ generated from the keystore seed K via Equations (1) and (2) satisfies the following keystore properties:

i) Given the seed bit positions $0 \le m_1 < m_2 < \ldots < m_t \le L-1$ for any selected key derivation set, the key bit sequence $k(m_1, m_2, \ldots, m_t)$ of key bit length l is random and uniformly distributed over $\{0,1\}^l$.

ii) For a first set of distinct seed bit positions $(m_1, \ldots, m_t)$ corresponding to a first selected key derivation set and a second set of distinct seed bit positions $(\hat{m}_1, \ldots, \hat{m}_t)$ corresponding to a second selected key derivation set where $(m_1, \ldots, m_t) \ne (\hat{m}_1, \ldots, \hat{m}_t)$ with $0 \le m_1 < \ldots < m_t \le L-1$ and $0 \le \hat{m}_1 < \ldots < \hat{m}_t \le L-1$, the probability of key collision is determined as $$Pr\{k(m_1,\ldots,m_t)=k(\hat{m}_1,\ldots,\hat{m}_t)\}=2^{-l}$$

The derived seed bit sequences $K(m_i)K(m_i+1) \ldots K(m_i+l-1)$, $i=1, \ldots, t$ corresponding to the first selected key derivation set and the derived seed bit sequences $K(\hat{m}_i)K(\hat{m}_i+1) \ldots K(\hat{m}_i+l-1)$, $i=1, \ldots, t$ corresponding to the second selected key derivation set, produce the key bit sequences $k(m_1 m_2, \ldots, m_t)$ and $k(\hat{m}_1, \hat{m}_2, \ldots, \hat{m}_t)$, respectively. The seed bit positions $m_i$ and $\hat{m}_j$, $0 \le m_1 < \ldots < m_t \le L-1$ and $0 \le \hat{m}_1 < \ldots < \hat{m}_t \le L-1$, can be sorted in nondecreasing order with the sorted seed bit positions denoted by $r_i$, with $0 \le r_1 \le r_2 \le \ldots \le r_{2t} \le L-1$.

In embodiments of generating the key bit sequences $k(m_1, m_2, \ldots, m_t)$ and $k(\hat{m}_1, \hat{m}_2, \ldots, \hat{m}_t)$, each of these seed bit positions, $r_i$, can be used to determine a derived seed bit sequence as a string of l successive bits, $K(r_i)K(r_i+1) \ldots K(r_i+l-1)$, from the seed bit set $K=K(0)K(1) \ldots K(L-1)$. The L seed bits $K(0), K(1), \ldots, K(L-1)$ in the seed bit set can be considered as a cyclic ordered set, with $K(0)=K(L)$. For any of the seed bit positions $r_i$, if both adjacent seed bit positions from the first and second key derivation sets are offset by at least l bits, then the derived seed bit sequence for that seed bit position $r_i$ has no common bits with any of the other derived seed bit sequences for the first and second key derivation sets. That is, for a seed bit position $r_i$, with $r_i - r_{i-1} \ge l$ and $r_{i+1} - r_i \ge l$, where $r_{2t+1} = L + r_1$ and $r_{-1} = -L + r_{2t}$, the derived seed bit sequence $K(r_i)K(r_i+1) \ldots K(r_i+l-1)$ corresponding to $r_i$ does not have any common bits with any other derived seed bit sequence corresponding to $r_j$, $1 \le j \ne i \le 2t$. In such cases, the first key bit sequence $k(m_1, m_2, \ldots, m_t)$ and second key bit sequence $k(\hat{m}_1, \hat{m}_2, \ldots, \hat{m}_t)$ are independent. Such a seed bit position $r_1$, if it exists, may be termed an isolated component inside the vector of seed bit positions $r=(r_1, r_2, \ldots, r_{2t})$. Thus, the vector of seed bit positions $r=(r_1, r_2, \ldots, r_{2t})$ for a pair of key derivation sets has no isolated components if and only if for any seed bit position $r_i$, $i=1,2,\ldots,2t$, $$\min\{r_i - r_{i-1}, r_{i+1} - r_i\} \le l-1 \qquad (3)$$

Accordingly, a pair of key derivation sets $(m_1, \ldots, m_t)$ and $(\hat{m}_1, \ldots, \hat{m}_t)$ has no isolated components whenever the vector of seed bit positions $r=(r_1, r_2, \ldots, r_{2t})$ obtained by sorting the seed bit positions $m_1, \ldots, m_t, \hat{m}_1, \ldots, \hat{m}_t$ in nondecreasing order has no isolated components.

Consider any two independent key derivation sets $m=(m_1, \ldots, m_t)$ and $\hat{m}=(\hat{m}_1, \ldots, \hat{m}_t)$ with $0 \le m_1 < \ldots < m_t \le L-1$ and $0 \le \hat{m}_1 < \ldots < \hat{m}_t \le L-1$. Let E denote the event that $m=(m_1, \ldots, m_t)$ and $\hat{m}=(\hat{m}_1, \ldots, \hat{m}_t)$ have no isolated components. The probability of the independent key derivation sets having no isolated components can be defined as $$p = Pr\{E\}$$

In some embodiments the relationship between the keystore seed, the key bit size and the set of distinct seed bit positions in the selected key derivation set can be defined as $L > t(l-1)$. In such embodiments, for the keystore $\Psi=\{k_i: 1 \le i \le \Lambda\}$ generated from the keystore seed K via Equations (1) and (2), the following holds: for any two independent key derivation sets $m=(m_1, \ldots, m_t)$ and $\hat{m}=(\hat{m}_1, \ldots, \hat{m}_t)$ with $0 \le m_1 < \ldots < m_t \le L-1$ and $0 \le \hat{m}_1 < \ldots < \hat{m}_t \le L-1$, $$H(k(\hat{m})|m, \hat{m}, k(m)) \ge H(k(\hat{m})|\hat{m}) \times (1-p) = l(1-p)$$

In some embodiments the relationship between the keystore seed, the key bit size and the set of distinct seed bit positions in the selected key derivation set can be defined as $L > 2t(l-1)$. In such embodiments, in view of Property ii) set out above, for any two independent key derivation sets $m=(m_1, \ldots, m_t)$ and $\hat{m}=(\hat{m}_1, \ldots, \hat{m}_t)$ with $0 \le m_1 < \ldots < m_t \le L-1$ and $0 \le \hat{m}_1 < \ldots < \hat{m}_t \le L-1$, the probability of a key collision can be defined as $$Pr\{k(m)=k(\hat{m})\} = Pr\{k(m)=k(\hat{m}), m=\hat{m}\} + Pr\{k(m)=k(\hat{m}), m \ne \hat{m}\} = 1/\Lambda + 2^{-l} \times (1 - 1/\Lambda) \qquad (4)$$

Since $\{m=\hat{m}\} \subset E$, it follows that $$p \ge 1/\Lambda \qquad (5)$$

In embodiments where the relationship between the keystore seed, the key bit size and the set of distinct seed bit positions in the selected key derivation set can be defined as $L > 2t(l-1)$, the keystore $\Psi=\{k_i: 1 \le i \le \Lambda\}$ generated from the keystore seed K via Equations (1) and (2) can thus be shown to be information-theoretically $\epsilon$-secure with $\epsilon = p$.

Examples of upper bounds on p illustrating that p is quite small for various configurations of $(L, l, t)$ will be discussed below. The above discussion can also be extended to higher orders. To this end, the evaluation of isolated component can be extended to a vector of seed bit positions of any dimension (rather than limited to two key derivation sets having 2t seed bit positions as in the discussion above).

Consider a vector of seed bit positions $r=(r_1, r_2, \ldots, r_s)$ with dimensions satisfying $0 \le r_1 \le r_2 \le \ldots \le r_s \le L-1$ and $r_s - r_1 > 0$. As before, define $$r_{s+1} = L + r_1 \text{ and } r_0 = -(L - r_s)$$

The vector of seed bit positions $r=(r_1, r_2, \ldots, r_s)$ is defined to have no isolated components if for every seed bit position $r_i$, $i=1,2,\ldots,s$, at least one of the adjacent seed bit positions in the vector of seed bit positions is offset by at most $l-1$ bits. That is, for every seed bit position $r_i$, $i=1,2,\ldots,s$, $$\min\{r_i - r_{i-1}, r_{i+1} - r_i\} \le l-1 \qquad (6)$$

In other words, a seed bit position $r_i$ is an isolated component in the vector of seed bit positions $r=(r_1, r_2, \ldots, r_s)$ if and only if both adjacent seed bit positions are offset by at least l bits, i.e. $r_i - r_{i-1} \ge l$ and $r_{i+1} - r_i \ge l$.

For a plurality of independent key derivation sets $m_i = (m_1^i, m_2^i, \ldots, m_t^i)$, $i=1,2,\ldots,n+1$, where $0 \le m_1^i < m_2^i < \ldots < m_t^i \le L-1$ for any $i=1,2,\ldots,n+1$, sorting the seed bit positions $m_j^i$, $1 \le j \le t$, $1 \le i \le n+1$, in non-decreasing order results in a vector of seed bit positions $r=(r_1, r_2, \ldots, r_s)$ of dimension $s=(n+1)t$. The plurality of independent key derivation sets $m_i$, $i=1,2,\ldots,n+1$, have no isolated components if and only if the corresponding vector of seed bit positions $r=(r_1, r_2, \ldots, r_s)$ of dimension $s=(n+1)t$ has no isolated components.

Define the non-isolated component event $E_n$ as $$E_n = \{m_i, i=1,2,\ldots,n+1, \text{have no isolated components}\} \qquad (7)$$

and the probability of the non-isolated component event $p_n$ as $$p_n = Pr\{E_n\} \qquad (8)$$

It can be shown that $p_1 = p$. Further define $$\epsilon_n = \sum_{i=0}^{n-1} \binom{n+1}{i} p_{n-i} \qquad (9)$$

From the above it follows that $\epsilon_1 = p_1 = p$ and $\epsilon_2 = P_2 + 3p$.

In some embodiments the relationship between the keystore seed, the key bit size and the set of distinct seed bit positions in the selected key derivation set can be defined as $L > t(l-1)$. In such embodiments, for the keystore $\Psi = \{k_i: 1 \le i \le \Lambda\}$ generated from the keystore seed K via Equations (1) and (2), the following holds: for any independent key derivation sets $m_i = (m_1^i, m_2^i, \ldots, m_t^i)$, $i=1,2,\ldots,n+1$, where $0 \le m_1^i < m_2^i < \ldots < m_t^i \le L-1$ for any $i=1,2,\ldots,n+1$, $$H(k(m_{n+1})|m_{n+1}, \{m_i, k(m_i)\}_{i=1}^n) \ge H(k(m_{n+1})|(m_{n+1}) \times (1-\epsilon_n) = l \times (1-\epsilon_n) \qquad (10)$$

Accordingly, in embodiments where the relationship between the keystore seed, the key bit size and the set of distinct seed bit positions in the selected key derivation set is defined as $L > 2t(l-1)$, for any number $n \ge 1$, the keystore $\Psi = \{k_i: 1 \le i \le \Lambda\}$ generated from the keystore seed K via Equations (1) and (2) is information-theoretically $\epsilon$-secure up to order n, where $\epsilon = \epsilon_n$ is given by equations (6) to (9).

Some examples of upper bounds for $p_n$ (and hence $\epsilon_n$) will now be discussed, as well as examples of p and $p_n$ for particular configurations of $(L, l, t)$. Here, $p = p_1$.

In some embodiments the relationship between the keystore seed, the key bit size and the set of distinct seed bit positions in the selected key derivation set can be defined as $(n+1)t \times (l-1) < L$, where $n \ge 1$. In such embodiments, the upper bound on the probability of the independent key derivation sets $m_i$, $i=1,2,\ldots,n+1$, having no isolated components can be defined as:

$$p_n \le \min\{\hat{p}_n, 1\} \qquad (11)$$

and $$\hat{p}_n = L \left[ \prod_{i=1}^{n+1} \binom{it}{t} / \binom{L}{t} \right] \times \qquad (12)$$

$$\sum_{j=1}^{\lfloor \frac{s}{2} \rfloor} \binom{s-j-1}{j-1} (l)^{s-j} L \binom{L-(l-1)(j-1)-\lceil \frac{L}{s} \rceil}{j-1}$$

where $s=(n+1)t$.

Accordingly, $p_n$ can be shown to be very small for some example embodiments of the size of the keystore seed, the encryption key size, and the number of distinct seed bit positions in each key derivation set (L,l,t).

Tables 1 to 5 illustrate some examples of upper bounds on the probabilities of two or three independent key derivation sets having no isolated components, i.e., p and $P_2$ (calculated according to (11) and (12)) and a lower bound on the size $\Lambda$ of the keystore $\Psi$ for some example embodiments of (L,l,t).

In tables 1 to 5, scientific notation is used for clarity, where $1.8247e-12=1.8247 \times 10^{-12}$, for example. The selection of the encryption key length l as 256 or 128 in the example embodiments shown in tables 1 to 5 is consistent with AES-256 or AES-128, respectively. The selection of the key bit sequence length l as 300 is illustrative for embodiments where the key bit sequence $k(m_1, m_2, \ldots, m_t)$ may be modified to a shorter length, for example using a hash function as discussed below. Along with the discussion above, the example embodiments shown in Tables 1 to 5 illustrate that the keystore $\Psi=\{k_i: 1 \leq i \leq \Lambda\}$ generated from the keystore seed K via Equations (1) and (2) can be secure against attack to individual files or keys in the information theoretic sense when (L,l,t) are properly selected.

TABLE 1

Bounds on p, $p_2$, and $\Lambda$ with (t, 1) = (5, 128)

| L = | $2^{12}$ | $2^{13}$ | $2^{14}$ | $2^{15}$ | $2^{16}$ |
|---|---|---|---|---|---|
| p ≤ | 0.0052 | 1.2909e − 4 | 3.4768e − 6 | 9.9572e − 8 | 2.9666e − 9 |
| $p_2$ ≤ | 0.0101 | 3.5187e − 5 | 1.2780e − 7 | 4.7825e − 10 | 1.8247e − 12 |
| $\Lambda$ ≥ | $2^{53}$ | $2^{58}$ | $2^{63}$ | $2^{68}$ | $2^{73}$ |

TABLE 2

Bounds on p $p_2$, and $\Lambda$ with (t, 1) = (5, 256)

| L = | $2^{12}$ | $2^{13}$ | $2^{14}$ | $2^{15}$ | $2^{16}$ |
|---|---|---|---|---|---|
| p ≤ | 0.2235 | 0.0052 | 1.2889e − 4 | 3.4740e − 6 | 9.9525e − 8 |
| $p_2$ ≤ | 1 | 0.0100 | 3.5092e − 5 | 1.2762e − 7 | 4.7788e − 10 |
| $\Lambda$ ≥ | $2^{53}$ | $2^{58}$ | $2^{63}$ | $2^{68}$ | $2^{73}$ |

TABLE 3

Bounds on p $p_2$, and $\Lambda$ with (t, 1) = (10, 128)

| L = | $2^{13}$ | $2^{14}$ | $2^{15}$ | 216 | $2^{17}$ |
|---|---|---|---|---|---|
| p ≤ | 2.3928e − 5 | 1.3341e − 8 | 8.2203e − 12 | 5.7083e − 15 | 4.4505e − 18 |
| $p_2$ ≤ | 6.4278e − 5 | 7.9599e − 10 | 1.0969e − 14 | 1.7298e − 19 | 3.1717e − 24 |
| $\Lambda$ ≥ | $2^{108}$ | $2^{118}$ | $2^{128}$ | $2^{138}$ | $2^{148}$ |

TABLE 4

Bounds on p $p_2$, and $\Lambda$ with (t, 1) = (10, 256)

| L = | $2^{13}$ | $2^{14}$ | $2^{15}$ | $2^{16}$ | $2^{17}$ |
|---|---|---|---|---|---|
| p ≤ | 0.0455 | 2.3745e − 5 | 1.3293e − 8 | 8.2050e − 12 | 5.7025e − 15 |
| $p_2$ ≤ | 1 | 6.3505e − 5 | 7.9101e − 10 | 1.0933e − 14 | 1.7268e − 19 |
| $\Lambda$ ≥ | $2^{108}$ | $2^{118}$ | $2^{128}$ | $2^{138}$ | $2^{148}$ |

TABLE 5

Bounds on p $p_2$, and $\Lambda$ with (t,1) = (10,300)

| L = | $2^{13}$ | $2^{14}$ | $2^{15}$ | $2^{16}$ | $2^{17}$ |
|---|---|---|---|---|---|
| p ≤ | 0.2589 | 1.3296e − 4 | 7.3145e − 8 | 4.4053e − 11 | 2.9781e − 14 |
| $p_2$ ≤ | 1 | 8.5041e − 4 | 1.0387e − 8 | 1.3987e − 13 | 2.1389e − 18 |
| $\Lambda$ ≥ | $2^{108}$ | $2^{118}$ | $2^{128}$ | $2^{138}$ | $2^{148}$ |

As mentioned above, in some embodiments such as the example keystore $\Psi=\{k_i: 1 \leq i \leq \Lambda\}$ generated from the keystore seed K via Equations (1) and (2), each key bit sequence $k(m_1, m_2, \ldots, m_t)$ can be generated as a linear function of seed bit sequences derived from the keystore seed K. In some particular embodiments, the encryption keys may be generated as the key bit sequences. In such embodiments, if an attacker was able to acquire a significant number of encryption keys, the attacker may attempt to reconstruct the keystore seed K by solving a system of linear equations. To prevent such a reconstruction attack, some embodiments may generate the encryption keys using secure hash functions. That is, a secure hash function may be applied to the key bit sequence $k(m_1, m_2, \ldots, m_t)$ to generate a hashed key bit sequence. The encryption keys may then be generated from the hashed key bit sequences.

A function $f(x)$ is a one-way function if it is easy to compute an output value $f(x)$ for every input value x in the domain of $f$, but for almost all output values y in the range of $f$, it is computationally infeasible to find an input value x such that $f(x)=y$. (W. Diffie and M. Hellman, "New directions in cryptography," IEEE Transactions on Information Theory, vol. 22, no. 6, pp. 644-654, November 1976.) Let $\phi: \{0,1\}^l \to \{0,1\}^u$, where $u \leq l$, be a secure hash function satisfying the following secure hash properties:

P1. For any given hash output value $\beta$, it is computationally infeasible to find an input value $\alpha$ such that $\phi(\alpha)=\beta$. That is, the hash function can be a one-way function.

P2. If the input $\alpha$ is random and uniformly distributed over $\{0,1\}^l$, then the output $\beta=\phi(\alpha)$ is random and uniformly distributed over $\{0,1\}^u$.

The hash function can be applied to each key bit sequence in $k_i: 1 \leq i \leq \Lambda$ generated from the keystore seed K via Equations (1) and (2) to generate a corresponding hashed key bit sequence. An encryption key may then be generated from the hashed key bit sequence. For example, the encryption key may be generated to be the hashed key bit sequence in some embodiments. In some examples of such embodiments, an example hashed keystore $\phi(\Psi)$ can be generated as:

$$\phi(\Psi)=\{\phi(k(m_1,m_2,\ldots,m_t)):0 \leq m_1 < m_2 < \ldots < m_t \leq L-1\} \qquad (13)$$

In embodiments using hashed key bit sequences, even where an attacker is able to acquire a number of hashed keys, it follows from the one-way property P1 that it is still computationally infeasible to determine the corresponding key bit sequence $k(m_1, m_2, \ldots, m_t)$. Accordingly, embodiments using hashed key bit sequences can reduce the risk of reconstruction attacks. Furthermore, a hashed keystore $\phi(\Psi)$ remains information-theoretically $\epsilon$-secure up to order n, where $\epsilon=\epsilon_n$, as shown below.

In embodiments where the relationship between the keystore seed, the key bit size and the set of distinct seed bit positions in the selected key derivation set is defined as $L>t(l-1)$, for any number $n\geq 1$, the example hashed keystore $\phi(\Psi)$ defined in (13) is information-theoretically $\epsilon$-secure up to order n, where $\epsilon=\epsilon_n$ is given by (6) to (9).

An example implementation of an embodiment for generating one or more encryption keys from a keystore seed will now be described. In the example implementation, an encryption key is generated as a hashed key bit sequence.

In the example, the keystore seed $K_1$ may have a first bit length L of 4096 bits, and the key bit sequences (as well as the encryption keys) may each have a second bit length l of 256 bits. The keystore seed $K_1$ includes a plurality or set of seed bits $K_1=K_1(0)K_1(1) \ldots K_1(4095)$. A plurality of key derivation sets m can be determined, with each key derivation set defined to include a plurality of key derivation values $m_i$ for each encryption key. For each encryption key, the plurality of key derivation values in the key derivation set for that encryption key indicates how to derive that encryption key from the key seed K. For example, each key derivation value $m_i$ may correspond to a distinct seed bit position in the keystore seed $K_1$.

In some embodiments, for any key derivation set with $0 \leq m_1 < m_2 < \ldots < m_5 \leq 4095$, we can define a key bit sequence as:

$$k(m_1, m_2, \ldots, m_5) = \sum_{i=1}^{5} K(m_i)K(m_i+1) \ldots K_1(m_i+255)$$

where the string summation is the binary addition and the integer addition is with respect to module 4096. In this example, the keystore $\Psi$ including a plurality of encryption keys can be generated from the random seed $K_1$ as a hashed keystore according to:

$$\Psi = \{ \text{HMAC}(k(m_1, m_2, \ldots, m_5), \\ m_1 \| m_2 \| m_3 \| m_4 \| m_5 \| \text{OtherInput}) : \\ 0 \leq m_1 < m_2 < \ldots < m_5 \leq 4095 \}$$

where HMAC stands for the keyed-hash message authentication code with, here, for example, the SHA-256 hash as its embedded hash function (see for example, National Institute of Standards and Technology, The Keyed-Hash Message Authentication Code (HMAC). Federal Information Processing Standards Publication 198-1, July 2008), $\|$ denotes concatenation, and OtherInput represents other keying materials which, along with $m_1, m_2, \ldots, m_5$, can be appended to encrypted data. In the above example, to generate any individual encryption key from the key seed $K_1$ the key derivation values $m_1, m_2, \ldots, m_5$ of a particular key derivation set can be specified.

Note that in this example, $\Lambda \geq 2^{53}$. It can be further shown that in this case, Properties (1) to (4) mentioned above are satisfied. Specifically, the following hold:

a) Given any key derivation set with key derivation values $0 \leq m_1 < m_2 < \ldots < m_5 \leq 4095$, the key bit sequence $k(m_1, m_2, \ldots, m_5)$, and in turn the encryption key, is uniformly distributed over $\{0,1\}^{256}$.

b) For any pair of key derivation sets $(m_1, m_2, \ldots, m_5) \neq (\hat{m}_1, \hat{m}_2, \ldots, \hat{m}_5)$ with $0 \leq m_1 < m_2 < \ldots < m_5 \leq 4095$ and $0 \leq \hat{m}_1 < \hat{m}_2 < \ldots < \hat{m}_5 \leq 4095$, the probability of a key collision is $\Pr\{k(m_1, m_2, \ldots, m_5) = k(\hat{m}_1, \hat{m}_2, \ldots, \hat{m}_5)\} = 2^{-256}$ c) For any two independent key derivation sets $(m_1, m_2, \ldots, m_5)$ and $(\hat{m}_1, \hat{m}_2, \ldots \hat{m}_5)$ with $0 \leq m_1 < m_2 < \ldots < m_5 \leq 4095$ and $0 \leq \hat{m}_1 < \hat{m}_2 < \ldots < \hat{m}_5 \leq 4095$, one has:

$$H(k(\hat{m}_1, \hat{m}_2, \ldots \hat{m}_5) | m_1, m_2, \ldots m_5, \hat{m}_1, \hat{m}_2, \ldots \hat{m}_5, k(m_1, m_2, \ldots m_5)) \geq 0.6 \times 256$$

Results (a) to (c), together with the properties of HMAC, in turn imply Properties (1) to (4) above.

Given the properties of information-theoretical $\epsilon$-security, the embodiments described herein for generating keys using linear operations on keystore seeds can be secure against any attack to individual files or keys. Furthermore, embodiments using hashed encryption keys $\phi(\Psi)$ can be further robust against the keystore seed reconstruction attack. With a reasonable length of the keystore seed, the number $\Lambda$ of keys that can be generated randomly using the embodiments described herein is also large enough to support practical one-time-pad for most applications, as shown in Tables 1 to 5.

Embodiments described herein may simplify managing a large set of randomly generated keys by instead managing a single keystore seed K. With a smaller keystore seed, keystore seed management is simplified, while on the other hand, the number $\Lambda$ of random keys generated from a keystore seed should be large enough to support practical OTP. Accordingly, the size of the keystore seed may be selected based on particular applications (such as devices being connected through the Internet of Things) e.g. where the keystore seed has to be short. Accordingly, different implementations may have different results in the trade-off between $\Lambda$ and the length of the keystore seed subject to information-theoretical $\epsilon$-security with small $\epsilon$ and the condition that each key is easy to compute from its keying information and the keystore seed.

In some embodiments, the key bit sequence may be determined from the keystore seed and a key derivation set that is defined as a key derivation matrix. The key bit sequence may be determined according to:

$$k^T = AK^T \quad (14)$$

where the keystore seed $K=(K(0), K(1), \ldots, K(L-1))$ is defined as a row vector of length L that includes the seed bits from the keystore seed K; the key bit sequence k can be defined as a row vector of length l consisting of the key bits from the key bit sequence $k(m_1, m_2, \ldots, m_t)$, the transposed vectors of K and k are denoted by $K^T$ and $k^T$, respectively; and the key derivation matrix $A=(A_{ij})_{0 \leq i \leq l-1, 0 \leq j \leq L-1}$ is an l×L matrix corresponding to the key derivation set $(m_1, m_2, \ldots, m_t)$ with $$A_{ij} = \begin{cases} 1 & \text{if } j = m_a + i \text{ for some } 1 \leq a \leq t \\ 0 & \text{otherwise} \end{cases} \quad (15)$$

In (15), the addition of $m_a$ and i is with respect to module L. Note that each row of the key derivation matrix A contains t ones. A will be referred to as a matrix of slash type with row weight t. There is one to one correspondence between matrices of slash type with row weight t and key derivation set vectors $(m_1, m_2, \ldots, m_t)$ with $0 \leq m_1 < m_2 < \ldots < m_t \leq L-1$. Let $G(L,l,t)$ include the set of all l×L matrices of slash type with row weight t. Then the keystore $\Psi$ in (2) can also be rewritten as $$\Psi = \{k^T = AK^T : A \in G(L,l,t)\} \quad (16)$$

The slash structure of A provides a simple key index for encryption keys in the keystore $\Psi$. In some embodiments, it may not be necessary to use matrices of slash type in (14) and (16) in order for the keystore $\Psi$ to remain information-theoretically $\epsilon$-secure. For example, let G(L,l) be a set of l×L binary matrices such that P1. Each key derivation matrix A∈G(L,l) is of rank l;
P2. for any two distinct key derivation matrices $A_1, A_2 \in G$ (L,l), the sum of the distinct key derivation matrices $A_1 + A_2$ (module 2) is still of rank l, and
P3. for any two independent key derivation matrices $A_1, A_2$ selected randomly from G (L,l), the matrix $$\begin{pmatrix} A_1 \\ A_2 \end{pmatrix}$$

of size 2l×L is, with probability at least $(1-\epsilon)$, of rank 2l.

Replacing G(L,l,t) in (14) and (16) by G(L,l), illustrates that such embodiments may still provide information-theoretical $\epsilon$-security.

A particular keystore $\Psi(L,l,\epsilon,n)$ (A) can be defined as the set of encryption keys of length l generated according to algorithm A, from the random keystore seed K of length L bits and key indices i, such that $\Psi(L,l,\epsilon,n)$ (A) is information-theoretically $\epsilon$-secure up to order n with small E. Define the linear key capacity as $$C_\ell(L, l, \varepsilon, n) = \max_{A_\ell} |\Psi_L(L, l, \varepsilon, n)(A_\ell)| \quad (17)$$

and the general key capacity as $$C(L, l, \varepsilon, n) = \max_A |\Psi(L, l, \varepsilon, n)(A)| \quad (18)$$

where the maximization in (17) is taken over all possible linear algorithms $A_l$ which generate a key of length l from the random keystore seed K of length L bits and a key index i using linear operations, and the maximization in (18) is taken over all possible key generation algorithms A. We shall refer to $C_l(L,l,\epsilon, n)$ as the linear key capacity of the random keystore seed K with parameters (l,$\epsilon$,n), and C(L,l, $\epsilon$,n) as the general key capacity of the random keystore seed K with parameters (l,$\epsilon$,n). The size $$\Lambda = \binom{L}{t}$$

of the keystore $\Psi$ in (2) provides a lower bound to the linear key capacity $C_l(L,l,\epsilon,n)$ when $\epsilon = \epsilon_n$.

Embodiments described herein for information-theoretically $\epsilon$-secure key generation may be contrasted with processes for data compression. In data compression (see, for example, T. Cover and J. Thomas, *Elements of Information Theory*. Wiley & Sons, New York, 2006; J. C. Kieffer and E.-H. Yang, "Grammar based codes: A new class of universal lossless source codes," *IEEE Trans. Inform. Theory*, Vol. IT-46, No. 3, pp. 737-754, May 2000; E.-H. Yang and J. C. Kieffer, "Efficient universal lossless compression algorithms based on a greedy sequential grammar transform—Part one: Without context models," *IEEE Trans. Inform. Theory*, Vol. IT-46, No. 3, pp. 755-777, May 2000) the purpose is to compress a long sequence of (strongly or weakly) dependent random bits into a shorter sequence of independent and uniformly random bits. By contrast, in embodiments of information-theoretically $\epsilon$-secure key generation, the purpose is to expand a short sequence of independent and uniformly random bits (i.e., the keystore seed) into a much larger set of weakly dependent keys with each key still being uniformly random over the key space $\{0,1\}^l$.

Figure 2:
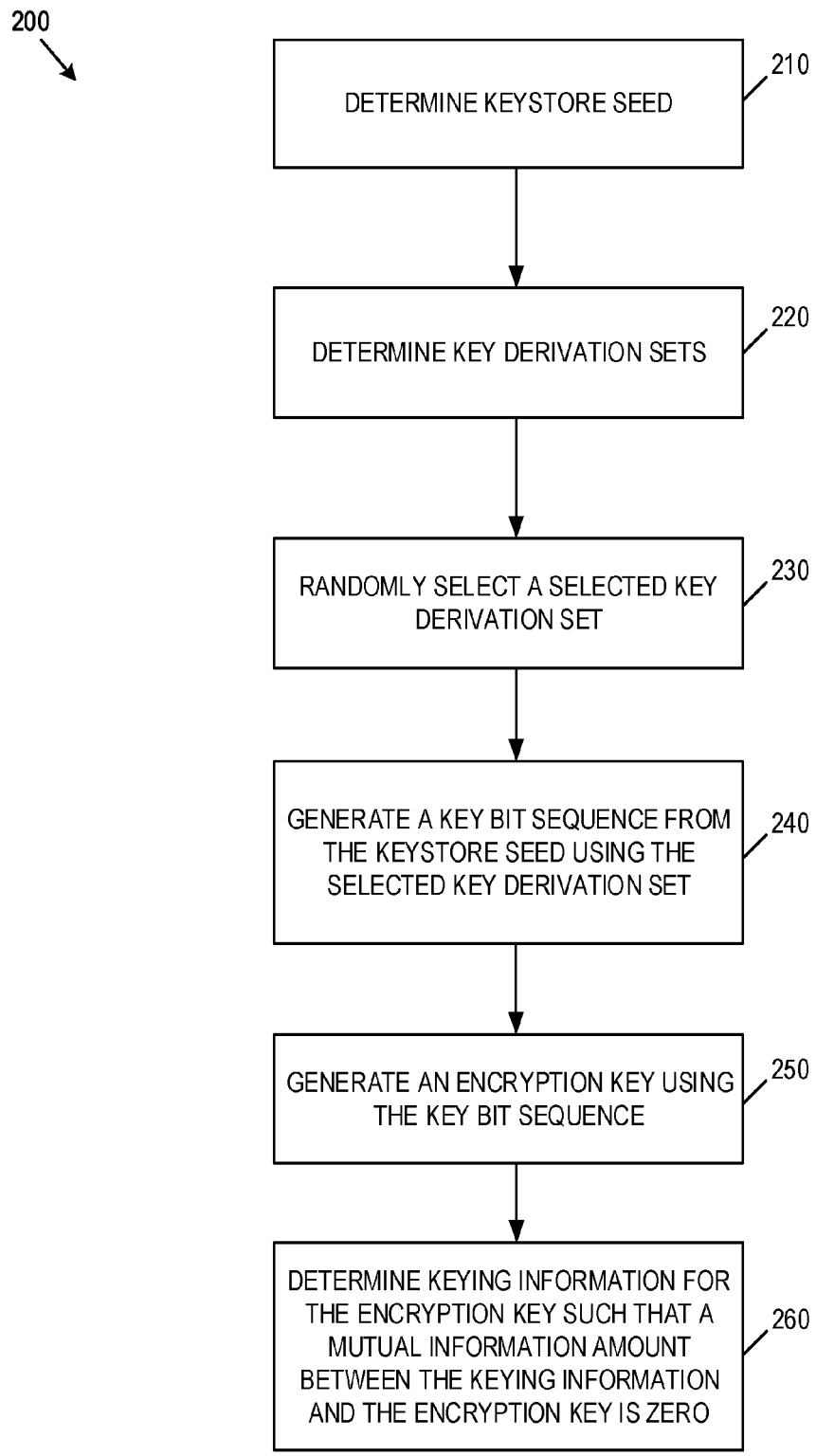
FIG. 2 shows a flowchart of an example embodiment of a method for generating an encryption key on a computing device.

Referring now to FIG. 2, shown therein is an example embodiment of an encryption process 200. Encryption process 200 is an example of a process that may be performed by an encryption application 114 installed on a computing device 102. The encryption application 114 may be provided to a computing device 102, e.g. for download from Q-server 130, for installation on that computing device.

At 210, the encryption application 114 can be operated to generate a keystore seed. The keystore seed can include a seed bit set with L seed bits in an ordered sequence. In general, L will be an integer greater than 3 and some specific examples for L have been given above in Tables 1 to 5. Each seed bit in the seed bit set has a seed bit position in the ordered sequence. The seed bits in the seed bit set can also be independent and identically distributed, so that each seed bit has an equal probability of taking any value within the seed bit space.

In some cases, the encryption application 114 may generate one or more keystore seeds with assistance from the Q-server 130. The server 130 may randomly generate server key values for the first user. The server key values can be stored in the non-volatile memory of the server and transmitted to the device 102. The encryption application 114 can generate the plurality of key seeds based on the server key values and the plurality of key indicators.

In some embodiments, encryption application 114 may send a key indicator amount to Q-Server 130. The key indicator amount may identify a number of key indicators generated by the encryption application 114. The key indicator amount may be in the form of a pair of integers (0,J). The key indicator amount may indicate to server 130 that its assistance is requested to generate keystore seeds.

Upon receiving the key indicator amount (e.g. the pair of integers (0,J), Q-Server 130 can generate server key values as independent random numbers $V_0, V_1, \ldots, V_J$. The server key values may be random numbers. The server 130 can send the random numbers $V_0, V_1, \ldots, V_J$ back to the encryption application 114. The encryption application 114 can then generate one or more independent keystore seeds using those random numbers. Further details of methods for generating keystore seeds are described in the Applicant's U.S. patent application Ser. No. 14/737,940 filed Jun. 12, 2015, entitled "METHODS, SYSTEMS AND COMPUTER PROGRAM PRODUCT FOR PROVIDING ENCRYPTION ON A PLURALITY OF DEVICES" which has now been published as US2015/0363607A1 and Applicant's PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" now published as PCT Patent Publication No. WO2015/188277.

The encryption application 114 can store the keystore seed on the computing device 102. The keystore seed may be stored in an encrypted manner, for instance where a verification code is required before the keystore seed can be determined on the computing device 102.

At 220, the encryption application 114 can determine a plurality of key derivation sets. Each key derivation set can be determined to include a plurality of key derivation values. The key derivation values may correspond to seed bit positions in the ordered sequence of the keystore seed.

In some embodiments, the key derivation values in each key derivation set may include a set of t distinct seed bit positions in the ordered sequence, where t is an integer greater than or equal to 1. The plurality of key derivation sets can be determined to include all the possible sets of t distinct seed bit positions in the plurality of key derivation sets. That is, in some embodiments each possible set of t distinct seed bit positions may be determined to be one of the key derivation sets. Accordingly, the plurality of key derivation sets may include all possible permutations of t distinct seed bit positions in the ordered sequence.

In some embodiments, each key derivation set may be a binary matrix of size l×L with rank of l. The plurality of key derivation sets can be determined to include a plurality of binary matrices of size l×L with rank of l, where the plurality of binary matrices is determined such that the module 2 addition of any two binary matrices in the plurality of binary matrices is also of rank l.

At 230, the encryption application 114 can select one of the key derivation sets in the plurality of key derivation sets as a selected key derivation set. The encryption application 114 may randomly select the selected key derivation set. For instance, each key derivation set may be associated with a particular key index. The encryption application 114 may randomly select a key index value (e.g. using a random number generator) and then determine the selected key derivation set by identifying the key derivation set corresponding to that key index value.

At 240, the encryption application 114 can generate a key bit sequence from the seed bit set and the selected key derivation set. The key bit sequence may have l bits, where l is a positive integer less than L. In some cases, the key bit sequence may be generated by applying linear operations to the seed bit set. In other cases, non-linear operations such as one-way functions and hash functions may be applied to the seed bit set to obtain the key bit sequence.

In some embodiments, the encryption application 114 can generate the key bit sequence by determining a plurality of derived seed bit sequences from the seed bit set. The plurality of derived seed bit sequences can include one derived seed bit sequence for each of the key derivation values in the selected key derivation set.

For example, for each of the t distinct seed bit positions in a selected key derivation set, a derived seed bit sequence may be determined from the seed bit set. Each derived seed bit sequence can be determined to include l consecutive bits from the seed bit set (following the ordered sequence). The l consecutive bits for each derived seed bit sequence may begin from a seed bit whose seed bit position in the ordered sequence is equal to the corresponding distinct seed bit position in the selected key derivation set. Each derived seed bit sequence may then include the l-1 successive seed bits in order following along in a cycle of the ordered sequence. The key bit sequence may then be determined as a linear function (e.g. addition, subtraction) of the derived seed bit sequences in the plurality of derived seed bit sequences.

For example, as shown above in Equation (1) the key bit sequence $k(m_1, m_2, \ldots, m_t)$ can be generated according to $$k(m_1, m_2, \ldots, m_t) = \sum_{i=1}^{t} K(m_i)K(m_i+1) \ldots K(m_i+l-1)$$

where each derived seed bit sequence is defined by $K(m_i)K(m_i+1) \ldots K(m_i+l-1)$ and the selected key derivation set is defined as $0 \leq m_1 < m_2 < \ldots < m_t \leq L-1$.

In some embodiments, generating the key bit sequence may include multiplying the selected key derivation set as a binary matrix of size l×L by the keystore seed as a seed column vector of dimension L. The key bit sequence may then be determined as the key column vector of dimension l resulting from the multiplication.

For example, as shown in Equation (14) above, the key bit sequence may be generated according to $$k^T = AK^T$$

where the selected key derivation set is defined as a key derivation binary matrix A of size l×L with rank of l, $K=(K(0),K(1),\ldots,K(L-1))$ is the keystore seed row vector of dimension L that includes the seed bits of the seed bit set in their seed bit positions in the ordered sequence, and $K^T$ and $k^T$ are the transposes of K and k, respectively.

At 250, the encryption application 114 can generate an encryption key using the key bit sequence. The encryption key may have u bits, where u is a positive integer not greater than l. In some cases, the encryption application 114 may generate the encryption key as the key bit sequence determined at 240. In other cases, the encryption application 114 may apply linear operations to the key bit sequence determined at 240 to generate the encryption key.

In some cases, the encryption application 114 may determine a hashed key bit sequence by applying a hash function to the key bit sequence. The encryption application 114 may then determine the encryption key using the hashed key bit sequence. In some cases, the encryption application 114 may determine the encryption key to be the hashed key bit sequence.

At 260, the encryption application 114 may determine keying information corresponding to the encryption key generated at 250. The keying information can be determined from the selected key derivation set used to generate the encryption key. The keying information is generated to enable the encryption application 114 to re-generate the encryption key from the keystore seed.

The encryption application 114 can generate the keying information such that the selected key derivation set is derivable from the keying information. For example, the encryption application 114 may define a key derivation index for the plurality of key derivation sets. The keying information may then be defined to include the key derivation index value corresponding to the selected key derivation set. In some cases, the encryption application 114 may generate the keying information as the key derivation values for the selected key derivation set.

The encryption application 114 can also generate keying information for the encryption key so that the mutual information between the encryption key and the keying information is zero. Accordingly, the encryption key and the keying information can be generated to be statistically independent. As such, the keying information may disclose zero information about the encryption key directly in the absence of knowledge of the keystore seed.

Accordingly, if an encrypted file is transmitted along with its keying information, the keying information does not provide any additional information to allow an attacker to decrypt the encrypted file unless the attacker also has knowledge of the keystore seed. Thus, encryption files may be transmitted along with the corresponding keying information (potentially even in plaintext) to a receiving party having the same keystore seed to allow them to easily decrypt the encrypted file.

The encryption application 114 may derive a plurality of encryption keys (i.e. keystore $\Psi$) $\Psi=\{k_i: 1 \leq i \leq \Lambda\}$ from random key seeds $K_1, K_2, \ldots, K_J$, where $\Lambda$ is a large number. When the encryption application 114 receives a file for encryption, the file can be encrypted using one of the derived encryption keys from the keystore $\Psi$. Similarly, when a file is moved to the encryption application 114, or modified under the control of the encryption application 114, the encryption application 114 can encrypt and store the new or modified file using the derived encryption key. For example, the encryption application 114 may select an encryption key from the keystore to use to encrypt the file. In some cases, the encryption application 114 may randomly select the particular encryption key from the plurality of encryption keys when the encryption application 114 receives an indication of the file to be encrypted (e.g. an indication that a file is being moved to the encryption application 114, created in the encryption application 114 for storage, or modified in the encryption application 114). The encryption application 114 can then store the encrypted file along with keying information, which indicates how to derive the particular encryption key for that file from the key seeds $K_1, K_2, \ldots, K_J$ or from the keystore $\Psi$.

For example, the encryption application 114 may generate a key index for the plurality of derived encryption keys. The key index may define a key index value for each encryption key in the plurality of encryption keys or keystore. When a particular encryption key is selected from the plurality of encryption keys and used to encrypt a file, the keying information for that file may include the key index value for that particular encryption key.

Figure 3:
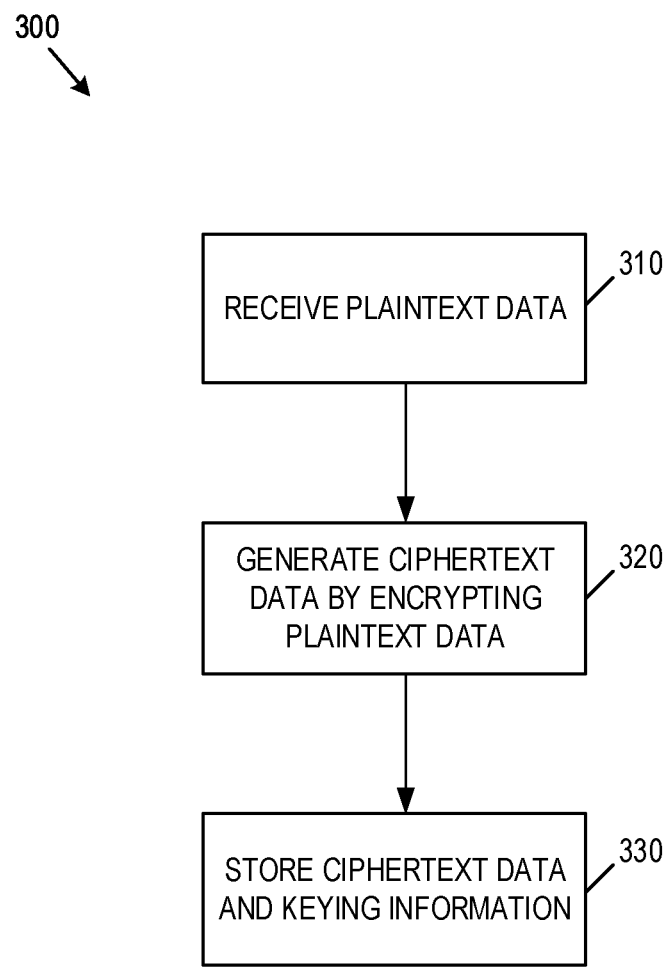
FIG. 3 shows a flowchart of an example embodiment of a method for generating ciphertext data on a computing device.

Referring now to FIG. 3, shown therein is an example embodiment of a process 300 for generating and storing ciphertext data. The process 300 may implemented using the encryption application 114 on one of the computing devices 102.

At 310, the encryption application 114 may receive plaintext data to be encrypted. For example, the encryption application may receive an unencrypted file such as documents or images files. The encryption application may also receive other data such as messages in plaintext. The encryption application 114 may then be used to encrypt the plaintext data, e.g. for storage on the device 102, for transmission to a cloud server 150 for storage, for transmission to a second device 102B (for example directly to the second device 102B through a network, or through the cloud server 150, or otherwise transmitted to the second device) or other device or storage platform for encrypted storage, or decryption and review or editing.

At 320, the encryption application 114 can generate ciphertext data from the plaintext data by encrypting the plaintext data using an encryption key such as an encryption key generated at 250 of process 200. The encryption key can be derived in various ways, as described above, such as by selecting a particular encryption key from a keystore. The encryption key may be randomly selected or randomly generated when the encryption application 114 receives an indication of the plaintext data to be encrypted.

Using the keystore seed(s) on a first device 102A, the encryption application 114 on that device can generate one or more encryption keys as described above in process 200. In some cases, the encryption application 114 may generate a plurality of encryption/decryption keys, i.e., a keystore on the first device 102A. In general the plurality of encryption/ decryption keys generated by the encryption application 114 may be symmetrical encryption/decryption keys. The plurality of encryption keys may then be stored on the non-volatile memory of the first device 102A. In some cases, the plurality of encryption keys may be encrypted (e.g. using the verification code) prior to being stored on the non-volatile memory of the first device 102a. In such cases, the encryption application 114 may select one of the stored encryption keys to use in encrypting the plaintext data.

Alternatively, as mentioned above, the encryption application 114 may not store encryption keys on a computing device 102. Rather, the encryption application 114 may generate an encryption key using the keystore seed each time plaintext data is to be encrypted. The keying information corresponding to the generated encryption key may also be generated as described at 260 in process 200.

At 330, the encryption application 114 may store the ciphertext data generated at 320 along with the corresponding keying information. The keying information may enable the encryption application to generate the encryption key in order to subsequently decryption the ciphertext data.

The encrypted file/ciphertext data can be stored to the non-volatile memory of the device 102. In some cases, the encrypted file need not be stored to the device 102. For example, the encrypted file may be transmitted to another device 102 or to a cloud server 150 along with the keying information. In some embodiments, the file and the encrypted file can be erased from the device 102 on which it was encrypted after transmission.

As mentioned, the encryption application 114 may generate an encryption key as necessary to encrypt plaintext data or decrypt ciphertext data. Accordingly, the encryption application 114 may delete the encryption key and the key bit sequence from a computing device 102 each time after particular ciphertext data is generated or decrypted. Thus, the encryption key itself is not vulnerable to being identified from being stored on the device. Further, the encryption application 114 can reduce the amount of storage required on the computing device 102.

Figure 4:
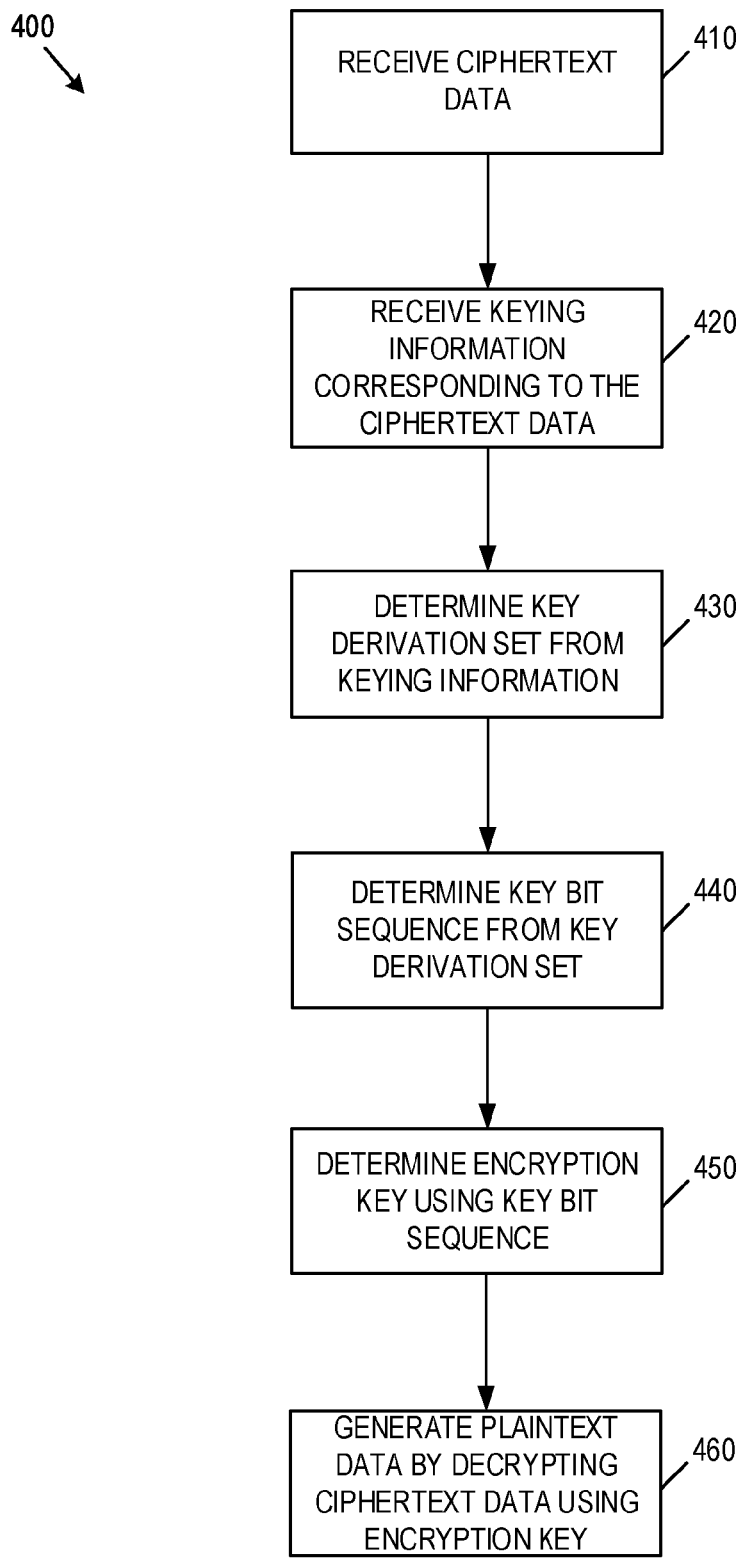
FIG. 4 shows a flowchart of an example embodiment of a method for generating plaintext data from ciphertext data on a computing device.

Referring now to FIG. 4, shown therein is an example embodiment of a process 400 that may be used to decrypt ciphertext data in accordance with an example embodiment. Process 400 may be implemented using the encryption application 114 on the same device 102 as was used to encrypt the plaintext data, or another device having the encryption application.

The operation of process 400 is generally the same whether it is on the same device 102 used to encrypt the plaintext data, or a different device 102, so long as each device has the same keystore seed. A second computing device may be provided with an encryption application 114 to be installed thereon. The encryption application 114 may then be used at the second computing device to determine the keystore seed and its seed bit set. The encryption application 114 may then be used to synchronize the keystore seed between the devices.

In order for files encrypted by the encryption application 114 on first device 102A to be decrypted by the encryption application 114 on the second device 102B (or any other device 102) after files are moved from the first device 102A to the second device 102B, the keystore seed(s) $\{K_1, K_2, \ldots, K_J\}$, in some example operations, can be synced across the devices 102. The keystore seed may be synchronized between computing devices either manually or automatically as discussed above and in the Applicant's U.S. patent application Ser. No. 14/737,940 filed Jun. 12, 2015, entitled "METHODS, SYSTEMS AND COMPUTER PRO- GRAM PRODUCT FOR PROVIDING ENCRYPTION ON A PLURALITY OF DEVICES" which has now been published as US2015/0363607A1 and Applicant's PCT Patent Application No. PCT/CA2015/050543 filed Jun. 12, 2015, entitled "METHODS, SYSTEMS AND COMPUTER PROGRAM PRODUCT FOR PROVIDING ENCRYPTION ON A PLURALITY OF DEVICES" now published as PCT Patent Publication No. WO2015/188277.

At 410, ciphertext data can be received by a computing device 102. The ciphertext data may be received from another computing device 102, retrieved from a cloud server 150, or otherwise transmitted to the computing device 102. In some cases, the ciphertext data may have been stored on the computing device 102 and is received by the encryption application 114 for decryption.

At 420, keying information can also be received at the computing device. The received keying information corresponds to the ciphertext data received at 410 and to the keystore seed used to generate the encryption key that was used to encrypt the ciphertext data.

In some cases, the ciphertext data and keying information may be received by a second computing device 102 different from the computing device on which the ciphertext data was generated. In such cases, the second computing device 102 may require the same keystore seed (and seed bit set) to be generated thereon as was used to encrypt the ciphertext data.

At 430, the encryption application 114 can determine a key derivation set from the received keying information. The determined key derivation set corresponds to the selected key derivation set used to generate the encryption key that was used to encrypt the ciphertext data.

At 440, the encryption application 114 can generate a key bit sequence having l bits from the seed bit set and the key derivation set determined at 430. The key bit sequence can be generated in the same manner as described above at 240 of process 200.

At 450, the encryption application can generate an encryption/decryption key having u bits using the key bit sequence determined at 440. The encryption/decryption key can be generated in the same manner as described above at 250 of process 200.

At 460, the encryption application 114 can generate plaintext data from the received ciphertext data by decrypting the ciphertext data using the encryption/decryption key determined at 450. A user of the computing device may then review and/or manipulate the plaintext data.

The encryption application 114 can decrypt the ciphertext files selected by a user and store the decrypted plaintext files temporarily in the volatile memory of the device 102 for the user to read and/or edit. After the user closes each plaintext file, the encryption application 114 may erase the plaintext file from the volatile memory of the device if there is no change. The encryption application 114 may encrypt the plaintext file again using a particular key (e.g. a new randomly picked key from the keystore W, the same key, or a newly derived encryption key), and store the encrypted file in the non-volatile memory of the device 102.

The encryption application 114 may overwrite the original encrypted file in the non-volatile memory of the device 102 with the newly encrypted file, and then wipe out the plaintext file from the volatile memory of device 102 if, on ceasing to access the plaintext file, the user has made any change to the plaintext file. Once again, the encryption application 114 may store keying information along with the encrypted file to enable the encryption key for that file to be derived from the keystore seed information or from the keystore.

The embodiments described herein may be implemented as systems, methods, devices and computer program products that provide key generation and management that may enable one-file-one-key secure encryption (also called practical one-time pad). In some such embodiments, each individual file can be encrypted using a unique key, from an information theoretic point of view.

The embodiments herein have been described in terms of information-theoretical $\epsilon$-security to measure the security of a keystore (i.e., a set of random keys, $k_i$, $1 \leq i \leq \Lambda$, each having length of l bits). In embodiments described herein the keystore, and the corresponding encryption keys, be generated from a keystore seed which may be provided as a set of seed bits which may be defined as random string of L bits.

Various embodiments of methods for generating encryption keys from the keystore seeds have been described. These include linear key generation methods as well as hashed key generation methods. Examples of the resulting keystores $\Psi = k_i : 1 \leq i \leq \Lambda$ and $\phi(\Psi) = \{\phi(k_i): 1 \leq i \leq \Lambda\}$ have been shown to be information-theoretically $\epsilon$-secure with small E. Particular examples with $L=2^{16}$ and $l=256$ described above show that $\Lambda$ can be greater than $2^{138}$ and $\epsilon$ can be less than $8.205 \times 10^{-12}$. The information-theoretical $\epsilon$-security of the encryption keys generated in the example keystores $\Psi$ and $\phi(\Psi)$ along with the large number of encryption keys that can be generated of $\Lambda$ easily from the keystore seed and key derivation sets (and key derivation values) may enable applications of practical one-time pad to large-scale data communications and storage systems while removing challenges in distributing and managing a large set of random keys.

A number of example embodiments have been described herein. However, it will be understood by persons skilled in the art that other variations and modifications may be made without departing from the scope of the embodiments as defined in the claims appended hereto.

The invention claimed is:

1. An encryption method comprising:
providing an encryption application for installation on a computing device;
operating the encryption application to determine a keystore seed comprising a seed bit set with L seed bits in an ordered sequence where L is an integer greater than 3, wherein each seed bit in the seed bit set has a seed bit position in the ordered sequence, and the L seed bits in the seed bit set are independent and identically distributed;
storing the keystore seed on the computing device using the encryption application;
operating the encryption application to determine a plurality of key derivation sets, each key derivation set including at least one key derivation value;
randomly selecting a selected key derivation set from the plurality of key derivation sets;
operating the encryption application to generate a key bit sequence having l bits from the seed bit set and the selected key derivation set, wherein l is a positive integer less than L;
generating an encryption key having u bits using the key bit sequence, wherein u is a positive integer not greater than l;
determining keying information corresponding to the encryption key, the keying information being determined from the selected key derivation set, wherein the selected key derivation set is derivable from the keying information and wherein a mutual information amount between the encryption key and the keying information is zero such that the encryption key and the keying information are statistically independent, and the keying information discloses zero information about the encryption key absent knowledge of the keystore seed;

receiving, by the encryption application, plaintext data;

operating the encryption application to generate ciphertext data by encrypting the plaintext data using the encryption key; and storing the ciphertext data and the corresponding keying information using the encryption application.

2. The method of claim 1, further comprising:

receiving second ciphertext data at the computing device;

receiving second keying information at the computing device, the second keying information corresponding to the second ciphertext data and to the keystore seed;

determining by the encryption application, a second key derivation set from the second keying information;

generating a second key bit sequence having l bits from the seed bit set and the second key derivation set;

generating a second encryption key having u bits using the second key bit sequence, wherein u is less than or equal to l; and generating second plaintext data by decrypting the second ciphertext data using the second encryption key.

3. The method of claim 1, wherein the at least one key derivation value in each key derivation set comprises a set of t distinct seed bit positions in the ordered sequence, and the plurality of key derivation sets is determined to include all possible sets of t distinct seed bit positions in the ordered sequence, wherein t is a integer greater than or equal to 1.

4. The method of claim 3, wherein generating the key bit sequence having l bits from the seed bit set and the selected key derivation set comprises:

determining a plurality of derived seed bit sequences from the seed bit set, the plurality of derived seed bit sequences including one derived seed bit sequence for each of the t distinct seed bit positions in the selected key derivation set, wherein each derived seed bit sequence includes l consecutive bits from the seed bit set, and the l consecutive bits for each derived seed bit sequence begin from the seed bit having the seed bit position equal to the corresponding distinct seed bit position in the selected key derivation set and includes the l−1 successive seed bits in a cycle of the ordered sequence; and determining the key bit sequence as a linear function of the derived seed bit sequences in the plurality of derived seed bit sequences.

5. The method of claim 4, wherein generating the key bit sequence having l bits from the seed bit set and the selected key derivation set comprises generating the key bit sequence $k(m_1, m_2, \ldots, m_t)$ according to $$k(m_1, m_2, \ldots, m_t) = \sum_{i=1}^{t} K(m_i)K(m_i+1) \ldots K(m_i+l-1)$$

wherein each derived seed bit sequence is determined by $K(m_i)K(m_i+1) \ldots K(m_i+l-1)$ and the selected key derivation set is defined as $0 \leq m_1 < m_2 < \ldots < m_t \leq L-1$.

6. The method of claim 1, wherein each key derivation set is a binary matrix of size l×L with rank of l, and the plurality of key derivation sets is determined to include a plurality of binary matrices of size l×L with rank of l such that the module 2 addition of any two of the binary matrices in the plurality of binary matrices is also of rank l.

7. The method of claim 6, wherein generating the key bit sequence having l bits from the seed bit set and the selected key derivation set comprises:

generating a key column vector of dimension l by multiplying the selected key derivation set as a binary matrix of size l×L by the keystore seed defined as a seed column vector of dimension L; and determining the key bit sequence as the key column vector.

8. The method of claim 6, wherein generating the key bit sequence having l bits from the seed bit set and the selected key derivation set comprises generating the key bit sequence k according to $$k^T = AK^T$$

where the selected key derivation set is the binary matrix A of size l×L with rank of l, $K=(K(0), K(1), \ldots, K(L-1))$ is a seed row vector of dimension L comprising the seed bits at their seed bit position in the ordered sequence, $K^T$ is the transpose of K and $k^T$ is the transpose of k.

9. The method of claim 1, wherein generating the encryption key having u bits using the key bit sequence comprises determining the encryption key to be the key bit sequence.

10. The method of claim 1, wherein generating the encryption key having u bits using the key bit sequence comprises:

determining a hashed key bit sequence by applying a hash function to the key bit sequence; and determining the encryption key to be the hashed key bit sequence.

11. The method of claim 1, further comprising:

providing the encryption application for installation on a second computing device;

operating the encryption application on the second computing device to determine the keystore seed comprising the seed bit set;

storing the keystore seed comprising the seed bit set on the second computing device using the encryption application;

receiving at the second computing device the ciphertext data and the keying information;

operating the encryption application on the second computing device to determine the selected key derivation set from the keying information;

operating the encryption application on the second computing device to determine the key bit sequence from the seed bit set stored on the second computing device and the selected key derivation set;

operating the encryption application on the second computing device to generate the encryption key using the key bit sequence; and operating the encryption application on the second computing device to generate the plaintext data by decrypting the ciphertext data using the encryption key.

12. The method of claim 1, further comprising deleting the encryption key and the key bit sequence from the computing device each time after a particular ciphertext data is generated or decrypted.

13. A computer program product comprising a non-transitory computer readable medium having computer executable instructions stored thereon, the instructions for configuring a processor of a computing device to:

determine a keystore seed comprising a seed bit set with L seed bits in an ordered sequence where L is an integer greater than 3, wherein each seed bit in the seed bit set has a seed bit position in the ordered sequence, and the L seed bits in the seed bit set are independent and identically distributed;

store the keystore seed on the computing device;

determine a plurality of key derivation sets, each key derivation set including at least one key derivation value;

randomly select a selected key derivation set from the plurality of key derivation sets;

generate a key bit sequence having l bits from the seed bit set and the selected key derivation set, wherein l is a positive integer less than L;

generate an encryption key having u bits using the key bit sequence, wherein u is a positive integer not greater than l;

determine keying information corresponding to the encryption key, the keying information being determined from the selected key derivation set, wherein the selected key derivation set is derivable from the keying information and wherein a mutual information amount between the encryption key and the keying information is zero such that the encryption key and the keying information are statistically independent, and the keying information discloses zero information about the encryption key absent knowledge of the keystore seed;

receive plaintext data;

generate ciphertext data by encrypting the plaintext data using the encryption key; and store the ciphertext data and the corresponding keying information.

14. The computer program product of claim 13, further comprising instructions for configuring the processor to:

receive second ciphertext data at the computing device;

receive second keying information at the computing device, the second keying information corresponding to the second ciphertext data and to the keystore seed;

determine a second key derivation set from the second keying information;

generate a second key bit sequence having l bits from the seed bit set and the second key derivation set;

generate a second encryption key having u bits using the second key bit sequence, wherein u is less than or equal to l; and generate second plaintext data by decrypting the second ciphertext data using the second encryption key.

15. The computer program product of claim 13, wherein the at least one key derivation value in each key derivation set comprises a set of t distinct seed bit positions in the ordered sequence, and the plurality of key derivation sets is determined to include all possible sets of t distinct seed bit positions in the ordered sequence, wherein t is an integer greater than or equal to 1.

16. The computer program product of claim 15, further comprising instructions for configuring the processor to generate the key bit sequence having l bits from the seed bit set and the selected key derivation set by:

determining a plurality of derived seed bit sequences from the seed bit set, the plurality of derived seed bit sequences including one derived seed bit sequence for each of the t distinct seed bit positions in the selected key derivation set, wherein each derived seed bit sequence includes l consecutive bits in the seed bit set, and the l consecutive bits for each derived seed bit sequence begin from the seed bit having the seed bit position equal to the corresponding distinct seed bit position in the selected key derivation set and includes the l−1 successive seed bits in a cycle of the ordered sequence; and determining the key bit sequence as a linear function of the derived seed bit sequences in the plurality of derived seed bit sequences.

17. The computer program product of claim 16, further comprising instructions for configuring the processor to generate the key bit sequence having l bits from the seed bit set and the selected key derivation set by generating the key bit sequence $k(m_1, m_2, \ldots, m_t)$ according to $$k(m_1, m_2, \ldots, m_t) = \sum_{i=1}^{t} K(m_i)K(m_i+1) \ldots K(m_i+l-1)$$

wherein each derived seed bit sequence is determined by $K(m_i)K(m_i+1) \ldots K(m_i+l-1)$ and the selected key derivation set is defined as $0 \leq m_1 < m_2 < \ldots < m_t \leq L-1$.

18. The computer program product of claim 13, wherein each key derivation set is a binary matrix of size l×L with rank of l, and the plurality of key derivation sets is determined to include a plurality of binary matrices of size l×L with rank of l such that the module 2 addition of any two of the binary matrices in the plurality of binary matrices is also of rank l.

19. The computer program product of claim 18, further comprising instructions for configuring the processor to generate the key bit sequence having l bits from the seed bit set and the selected key derivation set by:

generating a key column vector of dimension l by multiplying the selected key derivation set as a binary matrix of size l×L by the keystore seed defined as a seed column vector of dimension L; and determining the key bit sequence as the key column vector.

20. The computer program product of claim 18, further comprising instructions for configuring the processor to generate the key bit sequence having l bits from the seed bit set and the selected key derivation set by generating the key bit sequence k according to $$k^T = AK^T$$

where the selected key derivation set is the binary matrix A of size l×L with rank of l, $K=(K(0), K(1), \ldots, K(L-1))$ is a row vector of dimension L comprising the seed bits at their seed bit position in the ordered sequence, $K^T$ is the transpose of K and $k^T$ is the transpose of k.

21. The computer program product of claim 13 further comprising instructions for configuring the processor to generate the encryption key having u bits using the key bit sequence by determining the encryption key to be the key bit sequence.

22. The computer program product of claim 13 further comprising instructions for configuring the processor to generate the encryption key having u bits using the key bit sequence by:

determining a hashed key bit sequence by applying a hash function to the key bit sequence; and determining the encryption key to be the hashed key bit sequence.

23. The computer program product of claim 13 further comprising instructions for configuring a second processor of a second computing device to:

determine the keystore seed comprising the seed bit set at the second computing device;

store the keystore seed comprising the seed bit set on the second computing device;

receive at the second computing device the ciphertext data and the keying information;

determine the selected key derivation set from the keying information at the second computing device;

determine the key bit sequence from the seed bit set stored on the second computing device and the selected key derivation set;

generate the encryption key at the second computing device using the key bit sequence; and generate the plaintext data at the second computing device by decrypting the ciphertext data using the encryption key.

24. The computer program product of claim 13 further comprising instructions for configuring the processor to delete the encryption key and the key bit sequence from the computing device each time after a particular ciphertext data is generated or decrypted.

\* \* \* \* \*